(12) United States Patent
Tofte et al.

(10) Patent No.: US 12,385,590 B2
(45) Date of Patent: Aug. 12, 2025

(54) FLUSHABLE PILL SENSOR

(71) Applicant: STATE FARM MUTUAL AUTOMOBILE INSURANCE COMPANY, Bloomington, IL (US)

(72) Inventors: Nathan L. Tofte, Downs, IL (US); Brian N. Harvey, Bloomington, IL (US); Vicki King, Bloomington, IL (US); Joseph P. Harr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 257 days.

(21) Appl. No.: 18/122,871

(22) Filed: Mar. 17, 2023

(65) Prior Publication Data

US 2024/0142037 A1 May 2, 2024

Related U.S. Application Data

(60) Provisional application No. 63/432,209, filed on Dec. 13, 2022, provisional application No. 63/432,203, (Continued)

(51) Int. Cl.
*F16L 55/48* (2006.01)
*B65D 88/76* (2006.01)
(Continued)

(52) U.S. Cl.
CPC ............ *F16L 55/48* (2013.01); *B65D 88/76* (2013.01); *E02D 1/08* (2013.01); *E02D 19/06* (2013.01);
(Continued)

(58) Field of Classification Search
CPC ... F16L 55/48; F16L 2101/30; F16L 2201/30; F16L 55/00; F16L 23/167; F16L 55/26;
(Continued)

(56) References Cited

U.S. PATENT DOCUMENTS 11,354,748 B1 6/2022 Bryant et al.
11,482,092 B1 * 10/2022 O'Brien ................. G09G 5/377

FOREIGN PATENT DOCUMENTS

CN 114352845 A 4/2022
CN 114893646 A * 8/2022 ............. F16L 55/28

OTHER PUBLICATIONS

Chen, Qijin et al., "Positioning Accuracy of a Pipeline Surveying System Based on MEMS IMU and Odemeter: Case study", IEEE Access, vol. 7, Aug. 2019, pp. 104453-104461 (9 pages). (Year: 2019).*

(Continued)

*Primary Examiner* — Laura Martin
*Assistant Examiner* — Anthony W Menga Fuentes
(74) *Attorney, Agent, or Firm* — MARSHALL, GERSTEIN & BORUN LLP

(57) ABSTRACT

A system and method for detecting blockages or leaks in a piping system. A water-resistant pill sensor is tracked while it travels through the piping system. The pill sensor's travel speed, travel time, movement, images, audio, and/or other data determines if a leak or blockage exists, and if so, an electronic notification detailing the blockage or leak, its location, and corrective action is sent.

20 Claims, 8 Drawing Sheets

Related U.S. Application Data filed on Dec. 13, 2022, provisional application No. 63/432,207, filed on Dec. 13, 2022, provisional application No. 63/426,255, filed on Nov. 17, 2022, provisional application No. 63/423,710, filed on Nov. 8, 2022, provisional application No. 63/421,437, filed on Nov. 1, 2022.

(51) Int. Cl.
| | | |
|---|---|---|
| *E02D 1/08* | (2006.01) | |
| *E02D 19/06* | (2006.01) | |
| *G01M 3/00* | (2006.01) | |
| *G01M 3/24* | (2006.01) | |
| *G01M 3/38* | (2006.01) | |
| *F16L 101/30* | (2006.01) | |

(52) U.S. Cl.
CPC ......... *G01M 3/005* (2013.01); *F16L 2101/30* (2013.01)

(58) Field of Classification Search
CPC ....... F16L 2101/60; B65D 88/76; E02D 1/08; E02D 19/06; G01M 3/005; G01M 3/246; G01M 3/38; G01M 3/243; G01M 3/00; G01M 3/18; G01M 3/22; G01M 3/2823; G01M 3/28
USPC .................................. 73/40, 40.5 R, 40.5 A
See application file for complete search history.

(56) References Cited

OTHER PUBLICATIONS

U.S. Appl. No. 18/122,867, filed Mar. 17, 2023.
U.S. Appl. No. 18/122,873, filed Mar. 17, 2023.
U.S. Appl. No. 18/122,873, Nonfinal Office Action, dated Jan. 30, 2025.

* cited by examiner

FLUSHABLE PILL SENSOR

CROSS-REFERENCE TO RELATED APPLICATIONS

This application claims priority to and the benefit of the filing date of (1) provisional U.S. Patent Application No. 63/421,437 entitled "Methods and Systems for Detecting and Preventing Water Damage," filed on Nov. 1, 2022; (2) provisional U.S. Patent Application No. 63/423,710 entitled "Methods and Systems for Detecting and Preventing Water Damage," filed on Nov. 8, 2022; (3) provisional U.S. Patent Application No. 63/426,255 entitled "Methods and Systems for Detecting and Preventing Water Damage," filed on Nov. 17, 2022; (4) provisional U.S. Patent Application No. 63/432,203 entitled "Subterranean Water Pressure Sensors," filed on Dec. 13, 2022; (5) provisional U.S. Patent Application No. 63/432,207 entitled "Flushable Pill Sensor," filed on Dec. 13, 2022; and (6) provisional U.S. Patent Application No. 63/432,209 entitled "Robot Ball Detection Device," filed on Dec. 13, 2022. The entire contents of each of which is hereby expressly incorporated herein by reference.

FIELD OF THE DISCLOSURE

Systems and methods are disclosed for using sensor data and detecting and determining water leaks, water blockages and/or other abnormal water conditions within a home, structure, related equipment, and/or in pipes or piping systems, based upon at least the sensor data.

BACKGROUND

Homeowners may often be unable or unwilling to inspect pipes with the frequency needed to ensure a blockage or leak is detected. Similarly, they may be unable or unwilling to check for leaks in and around their property. In particular, it may be difficult, time consuming, and costly to access areas in and around a home to detect a leak, blockage or other abnormality, such as in, around and/or underneath a foundation or pipes. This may cause a leak or other water damage to go undetected for long periods of time leading to extensive damage. Even in the case where damage or some other abnormality is detected, the extent and severity of the damage may not be known, including which corrective action may be appropriate in a particular situation. Similarly, a property that an owner is not at frequently (e.g., a secondary home) or is currently away from (e.g., on a vacation) may have damage that goes unnoticed. Conventional techniques may include additional ineffectiveness, inefficiencies, encumbrances, and/or other drawbacks.

SUMMARY

The present embodiments may relate to, inter alia, accurately and efficiently determining and preventing water damage. Systems and methods that may detect or determine when a pipe or piping system has, or is likely to have, a blockage and/or leak are provided. Systems and methods that may detect or determine water damage or other abnormalities of a foundation or related equipment are also provided.

In one instance, a computer-implemented method of measuring water pressure on a foundation may be provided. The method may be implemented via one or more local or remote processors, servers, sensors, transceivers, memory units, mobile devices, wearables, smart glasses, smart watches, augmented reality glasses, virtual reality headset, and/or other electronic or electrical components. The method may include one or more processors and one or more sensors. In one instance, the method may include (1) receiving, by one or more processors and from one or more sensors, foundation environment data for an environment surrounding the foundation of a structure; (2) analyzing, by the one or more processors, the foundation environment data to determine one or more properties of the foundation environment, wherein the one or more properties of the foundation environment include at least a foundation water pressure; (3) generating, by the one or more processors and based at least upon a determination of whether the foundation water pressure reaches a predetermined threshold, a likelihood of damage to the foundation; and/or (4) generating, by the one or more processors, an alert based at least upon the likelihood of damage to the foundation. The method may include additional, less, or alternate actions and functionality, including that discussed elsewhere herein.

For instance, the foundation environment may include one or more of the foundation, soil, atmosphere, a drain tile, a water pipe, a septic tank, a sewage pipe, a pump, or a sump pit. In one aspect, the method may further include analyzing, by the one or more processors, the foundation environment data to determine one or more properties including one or more of (i) a chemical composition, (ii) a core analysis, (iii) a quantity, (iv) a humidity, (v) a flow rate, (vi) a level, (vii) a temperature, (viii) a pressure, (ix) a capacitance, or (x) a resistance of the foundation environment. The method may further include communicating, from the one or more sensors to the one or more processors, the foundation environment data wirelessly. The method may further include generating, by the one or more processors, a determination of one or more of a leak, a structural abnormality, a draining abnormality, an evaporation abnormality, or an operational abnormality in the foundation environment.

The one or more sensors may include one or more of (i) a moisture, (ii) an electrical, (iii) an optical, (iv) an ultrasonic, (v) an acoustic, (vi) a pressure, (vii) a transducer, (viii) a MEMS, (ix) a chemical, (x) an odor, (xi) a thermal, (xii) an infrared, (xiii) location, (xiv) a bubbler, (xv) a float, (xvi) a capacitance or (xvii) a resistance sensor. In one aspect, the method may include generating, by the one or more processors, a determination of a water table level by determining one or more of a capacitance or resistance between conductive materials. The method may also include in another aspect generating, by the one or more processors, a determination of a sewage pipe structural abnormality based at least upon determining an odor in a foundation environment atmosphere. The method may also include determining, by the one or more processors, a fill level of a septic tank.

The method may further include generating, by the one or more processors, a determination of an abnormal pump operation based upon correlating a sump pump evacuation rate with a historical pump evacuation rate under various conditions.

In one aspect, the method may include determining one or more of an impending, a potential, or an actual damage to the foundation.

In another aspect, the method may include generating one or more of a visual alert, an audio alert, or an electronic alert. Similarly, the alert may be received by a mobile device.

Analyzing the foundation environment data may include analyzing the foundation environment data based upon one or more of artificial intelligence, machine learning, a neural network, or deep learning to determine the one or more properties of the foundation environment; or generating the likelihood of damage to the foundation may include generating the likelihood of damage to the foundation based upon one or more of artificial intelligence, machine learning, a neural network, or deep learning.

In another aspect, a computer system for measuring water pressure on a foundation may be provided. The computer system may be implemented via one or more local or remote processors, servers, sensors, transceivers, memory units, mobile devices, wearables, smart glasses, smart watches, augmented reality glasses, virtual reality headset, and/or other electronic or electrical components. In one aspect, the system may include one or more processors; and one or more sensors. The one or more processors may be configured to (1) receive from the one or more sensors foundation environment data for an environment surrounding the foundation of a structure; (2) analyze the foundation environment data to determine one or more properties of the foundation environment, wherein the one or more properties of the foundation environment include at least a foundation water pressure; (3) generate based at least upon a determination of whether the foundation water pressure reaches a predetermined threshold, a likelihood of damage to the foundation; and/or (4) generate an alert based at least upon the likelihood of damage to the foundation. The system may include additional, less, or alternate functionality, including that discussed elsewhere herein.

For instance, the one or more sensors may include (i) a moisture, (ii) an electrical, (iii) an optical, (iv) an ultrasonic, (v) an acoustic, (vi) a pressure, (vii) a transducer, (viii) a MEMS, (ix) a chemical, (x) an odor, (xi) a thermal, (xii) an infrared, (xiii) location, (xiv) a bubbler, (xv) a float, (xvi) a capacitance or (xvii) a resistance sensor.

In one aspect, the foundation environment may include one or more of the foundation, soil, atmosphere, a drain tile, a water pipe, a septic tank, a sewage pipe, a pump, or a sump pit. In one aspect, the one or more processors may be configured to analyze the foundation environment data to determine one or more properties including one or more of (i) a chemical composition, (ii) a core analysis, (iii) a quantity, (iv) a humidity, (v) a flow rate, (vi) a level, (vii) a temperature, (viii) a pressure, (ix) a capacitance, or (x) a resistance of the foundation environment. The computer system may further generate a determination of one or more of (i) a leak, (ii) a structural abnormality, (iii) a draining abnormality, (iv) an evaporation abnormality, or (v) an operational abnormality in the foundation environment.

In one aspect, the computer system may include analyzing the foundation environment data based upon one or more of artificial intelligence, machine learning, a neural network, or deep learning to determine the one or more properties of the foundation environment; and/or generating the likelihood of damage to the foundation based upon one or more of artificial intelligence, machine learning, a neural network, or deep learning.

In one aspect, a computer-implemented method of detecting blockages or leaking pipes may be provided. The computer-implemented method may be implemented via one or more local or remote processors, servers, sensors, transceivers, memory units, cameras, audio recorders, mobile devices, spherical robots, robot balls, wearables, smart glasses, smart watches, augmented reality glasses, virtual reality headset, and/or other electronic or electrical components. The method may include one or more local or remote processors, transceivers, and/or sensors. In one aspect, the method includes (1) tracking, via one or more local or remote processors, transceivers, and/or sensors, a water-resistant pill sensor traveling through one or more piping systems and/or tracking a position or estimated location of the pill sensor as the pill sensor travels through the one or more piping systems; (2) estimating, via the one or more local or remote processors, transceivers, and/or sensors, a travel speed and/or travel time of the pill sensor through the one or more piping systems; (3) determining or detecting, via the one or more local or remote processors, transceivers, and/or sensors, that a blockage or leak in the one or more piping systems exists based upon the pill sensor (i) travel speed, (ii) travel time, (iii) movement through the one or more piping systems, (iv) images, (v) audio or acoustic data sets, or (vi) other data sets; and/or if a blockage or leak exists: (a) determining or detecting, via the one or more local or remote processors, transceivers, and/or sensors, a location of the blockage or leak in the one or more piping systems exists; (b) generating and transmitting, via the one or more local or remote processors, transceivers, and/or sensors, an electronic notification detailing the blockage or leak, and a location of the blockage or leak, to a mobile device of user or home owner; and/or (c) generating and transmitting, via the one or more local or remote processors, transceivers, and/or sensors, an electronic notification detailing one or more corrective actions to mitigate an impact of the blockage or leak to a mobile device of user or home owner. The method may include additional, less, or alternate actions and functionality, including that discussed elsewhere herein.

In one aspect, the pill sensor may be configured for wireless communication and may include one or more (i) processors, (ii) transceivers, (iii) sensors, (iv) GPS units, (v) cameras, (vi) LIDAR units, (vii) acoustic units, (viii) RFID component(s), (ix) clocks, (x) timers, (xi) odor detectors/sensors, and/or other electronic or electrical components. In another aspect, the method may include receiving, via the one or more local or remote processors, transceivers, and/or sensors, images of the blockage, or one or more blockages, in the one or more piping systems from the pill sensor. Similarly, the method may include receiving, via the one or more local or remote processors, transceivers, and/or sensors, images of the leak, or one or more leaks, in the one or more piping systems from the pill sensor. Also similarly, the method may include receiving, via the one or more local or remote processors, transceivers, and/or sensors, photographic images of the leak, or one or more leaks, in the one or more piping systems taken by a camera located on the pill sensor. Similarly, the method may include receiving, via the one or more local or remote processors, transceivers, and/or sensors, radar-related or acoustic-related images of the leak, or one or more leaks, in the one or more piping systems taken or acquired by one or more radar or acoustic units located on the pill sensor.

In one aspect, the method may include (1) receiving, via the one or more local or remote processors, transceivers, and/or sensors, a speed, location, and acceleration of the pill sensor; and/or (2) determining, via the one or more local or remote processors, transceivers, and/or sensors, a blockage or leak in the one or more piping systems using the speed, location, and/or acceleration of the pill sensor.

In another aspect, the corrective action may be associated with clearing the blockage in the one or more piping systems. Similarly, the corrective action may be associated with fixing the leak in the one or more piping systems and/or a broken or leaking pipe.

In yet another aspect, a computer system for detecting blockages or leaks in pipes or piping systems may be provided. In one aspect, the computer system may be implemented via one or more local or remote processors, servers, sensors, transceivers, memory units, cameras, audio recorders, mobile devices, spherical robots, robot balls, wearables, smart glasses, smart watches, augmented reality glasses, virtual reality headset, and/or other electronic or electrical components. The computer system may include one or more local or remote processors, transceivers, and/or sensors; and one or more water-resistant pill sensors. In one aspect, the one or more local or remote processors, transceivers, and/or sensors configured to (1) track a pill sensor traveling through one or more piping systems and/or track a position or estimated location of the pill sensor as the pill sensor travels through the one or more piping systems; (2) estimate a travel speed and/or travel time of the pill sensor through the one or more piping systems; (3) determine or detect that a blockage or leak in the one or more piping systems exists based upon the pill sensor (i) travel speed, (ii) travel time, (iii) movement through the one or more piping systems, (iv) images, (v) audio or acoustic data, or (vi) other data sets; and/or if a blockage or leak exists: (a) determine or detect a location of the blockage or leak in the one or more piping systems exists; (b) generate and transmit an electronic notification detailing the blockage or leak, and a location of the blockage or leak, to a mobile device of user or home owner; and/or (c) generate and transmit an electronic notification detailing one or more corrective actions to mitigate an impact of the blockage or leak to a mobile device of user or home owner. The system may include additional, less, or alternate actions or functionality, including that discussed elsewhere herein.

In one aspect, the pill sensor may be configured for wireless communication and may include one or more (i) processors, (ii) transceivers, (iii) sensors, (iv) GPS units, (v) cameras, (vi) LIDAR units, (vii) acoustic units, (viii) RFID component(s), (ix) clocks, (x) timers, (xi) odor detectors/sensors, and/or other electronic or electrical components. The system may receive images of the blockage, or one or more blockages, in the one or more piping systems from the pill sensor. Similarly, the system may receive images of the leak, or one or more leaks, in the one or more piping systems from the pill sensor. Also similarly, the system may receive photographic images of the leak, or one or more leaks, in the one or more piping systems from the pill sensor. Similarly, the system may receive radar-related, acoustic-related and/or sonar-related images of the leak, or one or more leaks, in the one or more piping systems taken or acquired by one or more radar or acoustic units located on the pill sensor.

In one aspect, the system may receive a speed, location, and/or acceleration of the pill sensor; and determine a blockage or leak in the one or more piping systems using the speed, location, and/or acceleration of the pill sensor.

In another aspect, the corrective action may be associated with clearing the blockage in the one or more piping systems. Similarly, the corrective action may be associated with fixing the leak in the one or more piping systems and/or a broken or leaking pipe.

In another aspect, a computer-implemented method of detecting blockages or leaking pipes may be provided. The method may be implemented via one or more local or remote processors, servers, sensors, transceivers, memory units, cameras, audio recorders, mobile devices, spherical robots/robot balls, wearables, smart glasses, smart watches, augmented reality glasses, virtual reality headset, and/or other electronic or electrical components. The method may include one or more local or remote processors, transceivers, and/or sensors. In one aspect, the method may include (1) tracking, via one or more local or remote processors, transceivers, and/or sensors, a water-resistant spherical robot or robot ball traveling through one or more piping systems and/or tracking a position or estimated location of the robot ball as the robot ball travels through the one or more piping systems; (2) estimating, retrieving, or determining, via the one or more local or remote processors, transceivers, and/or sensors, a travel speed and/or travel time of the robot ball through the one or more piping systems; (3) determining or detecting, via the one or more local or remote processors, transceivers, and/or sensors, that a blockage or leak in the one or more piping systems exists based upon the robot ball (i) travel speed, (ii) travel time, (iii) movement through the one or more piping systems, (iv) images or image data, (v) audio or acoustic data, (vi) odor data, or (vii) other data sets; and/or if a blockage or leak exists: (a) determining or detecting, via the one or more local or remote processors, transceivers, and/or sensors, a location of the blockage or leak in the one or more piping systems exists; (b) generating and transmitting, via the one or more local or remote processors, transceivers, and/or sensors, an electronic notification detailing the blockage or leak, and a location of the blockage or leak, to a mobile device of user or home owner; and/or (c) generating and transmitting, via the one or more local or remote processors, transceivers, and/or sensors, an electronic notification detailing one or more corrective actions to mitigate the impact of the blockage or leak to a mobile device of user or home owner. The method may include additional, less, or alternate actions and functionality, including that discussed elsewhere herein.

In one aspect of the method, the robot ball may be configured for wireless communication and may include one or more (i) processors, (ii) transceivers, (iii) sensors, (iv) GPS units, (v) cameras, (vi) LIDAR units, (vii) acoustic units, (viii) RFID component(s), (ix) clocks, (x) timers, (xi) records, (xii) odor detectors/sensors, and/or other electronic or electrical components. In one aspect, the method may include receiving from the robot ball, via the one or more local or remote processors, transceivers, and/or sensors, images of the blockage, or one or more blockages, in the one or more piping systems. Similarly in another aspect, the method may include receiving from the robot ball, via the one or more local or remote processors, transceivers, and/or sensors, images of the leak, or one or more leaks, in the one or more piping systems. Similarly still in another aspect, the method may include receiving from the robot ball, via the one or more local or remote processors, transceivers, and/or sensors, audio or acoustic data associated with the leak, or one or more leaks, in the one or more piping systems. Also similarly in another aspect, the method may include receiving from the robot ball, via the one or more local or remote processors, transceivers, and/or sensors, photographic images of the leak, or one or more leaks, in the one or more piping systems taken by a camera or other sensor located on the robot ball. In another similar aspect, the method may include receiving from the robot ball, via the one or more local or remote processors, transceivers, and/or sensors, radar-related, acoustic-related or sonar-related images of the leak, or one or more leaks, in the one or more piping systems taken or acquired by one or more radar or acoustic units located on the robot ball.

In another aspect of the method, the method may include (1) receiving, via the one or more local or remote processors, transceivers, and/or sensors, a speed, location, and acceleration of the robot ball; and/or (2) determining, via the one or more local or remote processors, transceivers, and/or sensors, a blockage or leak in the one or more piping systems using the speed, location, and/or acceleration of the robot ball.

In one aspect of the method wherein the robot ball is an autonomous robot ball, the method may include (1) directing, via the one or more local or remote processors, transceivers, and/or sensors, the robot ball to travel autonomously to a specific location, including a location of a suspected or actual blockage or leak in the one or more piping systems; and/or (2) directing, via the one or more local or remote processors, transceivers, and/or sensors, the robot ball to acquire more images, audio, or other data sets, associated with a blockage or leak in the one or more piping systems.

In another aspect of the method, the corrective action may be associated with clearing the blockage in the one or more piping systems including using, directing, or moving the robot ball to clear all or some of the blockage by removing or collecting sediment or other buildup within the piping system. Similarly, in another aspect of the method, the corrective action may be associated with clearing the blockage in the one or more piping systems using the robot ball. Similarly still, in another aspect of the method, the corrective action may be associated with fixing the leak in the one or more piping systems and/or a broken or leaking pipe.

In another instance, a computer system for detecting blockages or leaks in pipes or piping systems may be provided. The system may be implemented via one or more local or remote processors, servers, sensors, transceivers, memory units, cameras, audio recorders, mobile devices, spherical robots/robot balls, wearables, smart glasses, smart watches, augmented reality glasses, virtual reality headset, and/or other electronic or electrical components. The system may include one or more local or remote processors, transceivers, and/or sensors; and one or more robot balls or spherical robots. In one aspect of the system, the one or more local or remote processors, transceivers, and/or sensors are configured to (1) track a robot ball traveling through one or more piping systems and/or track a position or estimated location of the robot ball as the robot ball travels through the one or more piping systems; (2) estimate, retrieve, or determine a travel speed and/or travel time of the robot ball moving through the one or more piping systems; (3) determine or detect that a blockage or leak in the one or more piping systems exists based upon the robot ball (i) travel speed, (ii) travel time, (iii) movement through the one or more piping systems, (iv) images or image data, (v) audio or acoustic data, (vi) odor data, or (vii) other sensor data; and/or if a blockage or leak exists: (a) determine or detect a location of the blockage or leak in the one or more piping systems exists; (b) generate and transmit an electronic notification detailing the blockage or leak, and a location of the blockage or leak, to a mobile device of user or home owner; and/or (c) generate and transmit an electronic notification detailing one or more corrective actions to mitigate the impact of the blockage or leak to a mobile device of user or home owner. The system may include additional, less, or alternate actions or functionality, including that discussed elsewhere herein.

In one aspect of the system, the robot ball may be configured for wireless communication and includes one or more (i) processors, (ii) transceivers, (iii) sensors, (iv) GPS units, (v) cameras, (vi) LIDAR units, (vii) acoustic units, (viii) RFID component(s), (ix) clocks, (x) timers, (xi) records, (xii) odor detectors/sensors, and/or other electronic or electrical components. In one aspect, the system may (1) receive a speed, location, and acceleration of the robot ball; and (2) determine a blockage or leak in the one or more piping systems using the speed, location, and/or acceleration of the robot ball.

In another aspect, the system may receive images of the blockage, or one or more blockages, in the one or more piping systems from the robot ball. Similarly, the system may receive images of the leak, or one or more leaks, in the one or more piping systems from the robot ball. Similarly still, the system may receive photographic images of the leak, or one or more leaks, in the one or more piping systems taken by a camera located on the robot ball. Also similarly, the system may receive radar-related or acoustic-related images of the leak, or one or more leaks, in the one or more piping systems taken or acquired by one or more radar or acoustic units located on the robot ball.

In another aspect, the robot ball may be configured for remote manual control of robot ball movement, or autonomous movement directed by the one or more local or remote processors.

In another aspect, the corrective action may be associated with clearing the blockage in the one or more piping systems including using or moving the robot ball to clear all or some of the blockage by removing or collecting sediment or other buildup within the piping system. Similarly, the corrective action may be associated with fixing the leak in the one or more piping systems and/or a broken or leaking pipe.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
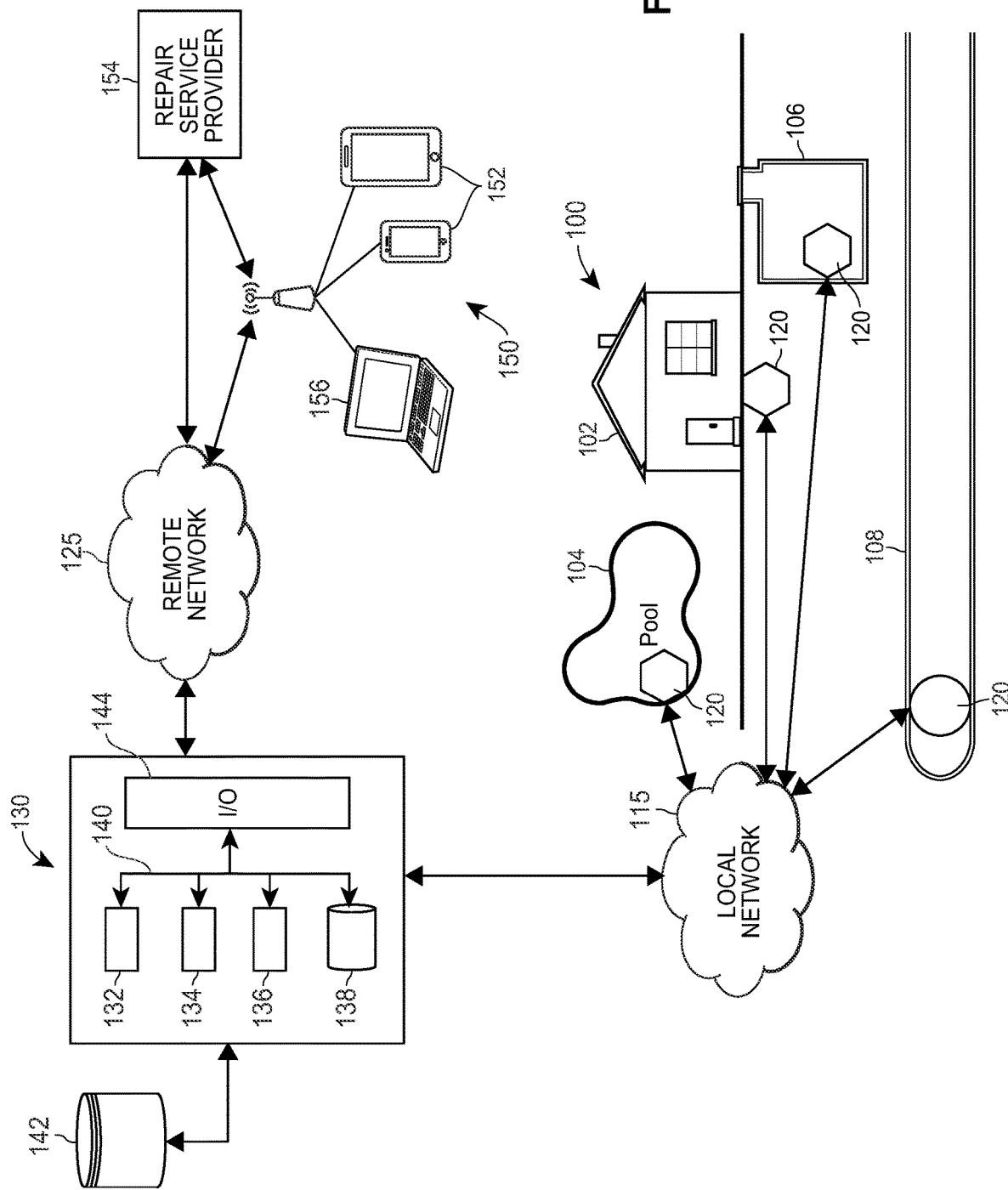
FIG. 1 depicts a block diagram of an exemplary computer system in which methods and systems for detecting and preventing water damage are implemented.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, detecting and determining water leaks, water blockages in pipes or piping systems, and/or other abnormal water conditions within a home or other structure. For instance, the systems and methods discussed herein may analyze sensor and other data to determine abnormal water conditions within a home, and then take corrective actions. The present embodiments may include (1) subterranean water pressure sensors; (2) pool or spa sensors; (3) flushable pill sensors; and/or (4) robot ball sensors.

Subterranean Water Pressure Sensors

Water pressure may build up over time on home foundations. As such, measuring the water pressure on the foundation may provide an indication of whether excess water is pressing up and causing damage to a home. In particular, sensors near a sump pump may allow a user to measure hydrostatic pressure and receive alerts as to whether the sump pump is functioning properly. Similarly, a flow rate sensor at a sump pit, a combination of sensors to determine incoming and outgoing water at the sump pit, or a cleanout port plug with a built-in float installed beneath a floor, may indicate if water is flooding a home and potentially causing water damage. Performing measurements in the ground near a home, such as analyzing core samples or measuring the changed resistance between two conductive rods, may similarly provide an indication of potential water pressure and/or damage to a home. Additionally or alternatively, the septic tank level may be measured, estimated, or otherwise determined for those that live in the country and have septic tanks.

Pool/Spa Sensors

An in-ground pool or spa may have pressure pushing against the foundation or may otherwise be leaking without a homeowner's knowledge. As such, implementing sensors to detect the overall incoming water and any outgoing water may allow a user to determine that a leak is present in a pool or spa. Similarly, measuring an overall change to the water level in the pool may allow a system or user to determine that pool water is being removed faster than evaporation or normal use would explain. Sensors to measure the chemicals present in, and/or pressure against, the walls of an in-ground pool or spa may similarly provide an indication for potential water damage or leakage.

Flushable Pill Sensor for Detecting Blockages & Leaks

A flushable pill sensor may similarly allow a user to detect blockages and/or leaking or broken pipes that a user may not normally be able to inspect. Using a GPS signal, an RFID indicator, weight sensor, etc., in conjunction with sensors installed in sewage systems may allow a user to determine a travel time of the pill sensor, travel speed of the pill sensor, and similar characteristics representative of an object traveling through a sewage system. Similarly, the addition of a camera or other imaging device to the pill sensor may allow for image feedback to assist in making such determinations.

In some embodiments, an RFID or sensor pill may be provided that the home owner drops into toilet. One or more sensors on a municipal sewer station or other infrastructure may detect the RFID or sensor pill. This may provide an indication of flow rate and impediments or blockages. The RFID or sensor pill may detect when it was dropped into the toilet or sewer system by sensing conductivity similar to a water alarm. That interactivity may capture the start time. The start time may be tacked onto the end of the RFID's name and may be parsed out when the pill is detected by a sensor the municipal sewer station.

Robot Ball Blockage & Leak Detection Device

Normally to detect blockages in a foundation, a user must hire a specialist to dig up a foundation and insert a scope for inspection. However, a robotic ball may be able to provide a similar inspection for significantly less disruption and cost. Because the robot is spherical, it may more easily navigate corners and otherwise explore the foundation. The use of rubberized ribs along the exterior of the device may allow for the device to individually clear out or ram through blockages. Similarly, a pressure washer may allow the device to guide water and rinse out areas underneath a house without extensive work. The device may additionally determine that more extensive work to clear blockages may be required and may instead transmit a report to the user before returning to a starting position.

In one embodiment, the robot ball may include rubber or plastic ribs or fins. A home owner may place the ball in sump inlet pipe. The ball may crawl the basement footing tile to clear debris and give a report on clogs and/or pooling. Debris may be cleared or loosened by the ball spinning fast and/or the ribs or fins scraping against the clog. In another embodiment, an ovalish "pill" variant may navigate with two side half-spheres and a center that contains a camera and digging mechanism, such as water jet for cleanout. In some aspects, a backward spray of water may be used as a method for forward propulsion.

In additional embodiments, the robot ball may have a sensor to detect sewer smell. Sometimes a "sewer smell" may smell a bit like a propane leak, so it is hard to distinguish. But by detecting sewer smell, the present embodiments may tell if a sewer pipe is broken or cracked, and/or malfunctioning, as sometimes the sewage may seep into the basement footing tile and into the sump pit.

Exemplary Sensors

One or more sensors may be hard-wired, wirelessly, and/or otherwise connected or interconnected in any suitable manner with one another and/or with one or more local or remote processors, transceivers, servers and/or sensors, each or any of which may be equipped with a processor, memory unit, software application(s), wireless transceiver(s), a local power supply, and/or various other components.

One or more sensors may sense, operate, or otherwise receive input and/or data in any suitable manner. This may include operating in a continuous and/or intermittent (e.g., every 5 millisecond) fashion. This may also include collecting, storing and/or transmitting data. The data may be stored permanently or non-permanently in any suitable manner, such as on a local storage means, (e.g., RAM or a hard drive), or remotely on a server, in the cloud and/or another remote storage means. One more sensors may collect, store and/or transmit data individually or collectively.

One or more sensors may communicate with one another in a wired, wireless or any other suitable manner. The communication may be continuous, intermittent, unidirectional, bidirectional or any other suitable means of communication. One or more sensors may act in concert, e.g., in creating a mesh network. One or more local or remote sensors may communicate or otherwise interface with one or more local or remote processors, transceivers, servers and/or sensors for various purposes which may be unrelated to determining water damage, such as for timing, scheduling, updates, error correction, troubleshooting, status reporting, or any other suitable purpose.

In certain embodiments, one or more sensors may be embodied as water-resistant flushable sensors which may inspect, or otherwise provide information related to, a piping network such as home sewage pipes. In some embodiments, a sensor being water-resistant may also include being waterproof. The flushable sensor may be pill-shaped and flushed down a toilet to investigate the condition of the pipes, and/or detect leaks, blockages or other abnormalities associated therewith. The flushable sensor may take any number of suitable forms and/or shapes which provide for traversal through plumbing and/or pipes. In one embodiment, the advantage of a pill or capsule shape may be the aerodynamics or other properties of such a shape which may allow for easy traversal of a plumbing and/or pipes. The flushable sensor may passively travel through plumbing and/or pipes (e.g., be carried by the flow of water) or may have any number of propulsive or locomotive means as is known in the art, such as motors, wheels, fins, wings, flaps, propellors, jets, or any other suitable propulsion means. The flushable pill may travel in an uncontrolled and/or controlled fashion including manually controlled, semi-autonomously, and/or autonomously. If moving in a controlled fashion, the flushable sensor may be steered, maneuvered and/or under other operative control locally and/or remotely, and carried out using any suitable communication means, including wired and/or wireless communication discussed infra and as is known in the art. The flushable pill may contain, house, have attached, or otherwise be operably connected to in any suitable manner one or more sensors. The sensors may be individual, packaged together (e.g., a system-on-a-chip), or any combination thereof.

In some embodiments, one or more sensors may be embodied as a water-resistant or waterproof spherical robot or robot ball traversing a foundation, including traveling through one or more piping systems, to investigate the condition of the foundation and/or pipes, and detect leaks, blockages or other abnormalities associated therewith. The robot ball may also take any number of suitable forms and/or shapes which provide for traversal around, across, under and/or inside of a foundation, plumbing and/or pipes. The robot ball may move passively (e.g., be carried by the flow of water) or may have any number of propulsive or locomotive means as is known in the art, such as motors, wheels, fins, wings, flaps, propellors, jets, or any other suitable propulsion means. The robot ball may travel in an uncontrolled and/or controlled fashion including manually controlled, semi-autonomously, and/or autonomously. If moving in a controlled fashion, the flushable sensor may be steered, maneuvered and/or other operative control locally and/or remotely and carried out using any suitable communication means, including wired and/or wireless communication discussed infra and as is known in the art. The flushable pill may contain, house, have attached, or otherwise be operably connected to in any suitable manner one or more sensors. The sensors may be individual, packaged together (e.g., a system-on-a-chip), or any combination thereof. In some embodiments, the robot ball may have integrally and/or non-integrally mechanisms to assist in clearing a blockage, which may include but are not limited to, ribs, spikes, grooves, treads, fins, wings, claws, bristles, solvents, lubricants, cleansers, protrusions, inclusions or any other suitable means which may be assist in clearing a blockage.

The sensors may gather data regarding the foundation, foundation environment and/or equipment. They may detect, predict and/or determine that the foundation, foundation environment, and/or equipment already has, or is about to have, a leak, blockage, structural abnormality, draining abnormality, evaporation abnormality, and/or operational abnormality which may indicate potential, impending, or actual water damage. The sensor data may be collected, analyzed and/or processed locally and/or remotely using algorithms, decision trees, artificial intelligence, machine learning, deep learning, neural networks, and/or any other suitable means, including but not limited to those used to detect, predict and/or determine a leak, blockage and/or abnormality in a foundation, environment, or equipment. The sensors may operate continuously or intermittently. In one embodiment, the sensor data may be stored and compared with historical data to identify trends, patterns, and/or other correlations which may include the use of artificial intelligence, machine learning, deep learning and/or neural networks. Sensor data may be continuously or intermittently collected, updated and/or analyzed to train and/or retrain machine learning models, especially but not limited to, those used to make determinations related to the foundation, foundation environment and/or related equipment. The data may be gathered from one or more sensors located on the property, remote sensors located on different properties (e.g., a neighbor), local or remote databases, data warehouses, data lakes, the cloud, the internet, the metaverse, or any other source of data. The data may be locally or remotely formatted, labeled, weighted, or otherwise processed before or after being stored, transmitted, processed and/or analyzed.

The sensors may, among other things, collect data related to, or directly or indirectly detect, determine and/or analyze, water levels, water pressure, water flow and/or evaporation rates. With regard to equipment, the sensors may likewise sense time the equipment has been in use, the number of times it has cycled on and off, signatures of motors and/or circuit boards that control equipment (such as pumps), and/or vibration or noise created by motors or pumps. Other data or information may be detected, recorded and/or considered when determining a leak, blockage, and/or abnormality such as maintenance records, rainfall levels, and/or corresponding historical operation rates of equipment under similar, past conditions, to name but a few.

In one aspect, a machine learning model may be trained using sump pump operating data and may be able to detect a situation where a sump pump is abnormally operating during a heavy rainfall which will result in the water damage to a foundation.

The sensors and/or system may identify portions of the foundation or pieces of equipment as leaking, blocked, plugged, faulty, abnormal, and/or in need of maintenance and/or repair and as such, issue to the property owner, repair service provider, or other party a related notification, e-mail, text or other communication, and/or take other corrective action(s).

The present aspects may advantageously allow for efficient and accurate detection and/or repair of water damage, leaks and blockages to a foundation or related equipment. For example, the system may accurately detect the occurrence of a blockage in the pipes of a home sewage system, and/or may transmit a likely cause and location of the blockage to the home owner or repair service provider. This may save the home owner or repair service provider time in locating the cause and location of the blockage, thereby reducing costs for performing the repair. The notification may additionally include sensor data, such as an image of the blockage, damage, or leak. The home owner or repair service provider may be able to view this on a smartphone, head-mounted display or other computer or mobile device.

Moreover, whereas a property owner and/or repair service provider may have to use various measuring instruments (e.g., a flow meter, etc.) and may have to excavate the foundation or take the equipment apart to detect the occurrence/cause of a blockage or leak, the system advantageously may detect failures directly from the foundation or pieces of equipment via the sensors. Furthermore, while repair service providers may be trained to detect leaks and blockages based on a set of characteristics discussed in their training, the system may continue to learn new sets of characteristics from previous sensor data received or from sensor data received at other properties. This may be done via algorithms, decision trees, artificial intelligence, machine learning, neural networks, and/or deep learning.

Definitions

The term "smart" as used herein, may refer to devices, sensors or equipment disposed on, inside, underneath, or proximate to a property or foundation with the ability to remotely communicate information about the device, sensor, or equipment and/or receive instructions for the device, sensor, or equipment. Some examples of equipment that may have sensors are, without limitation, valves, pipes, pumps (e.g., sump, pool, spa, hot tub and/or water pumps), septic tanks, sewage systems, pools, spas, hot tubs, sprinkler systems, toilets, showers, sinks, soil monitors, security cameras, and alarm systems. For example, a sump pump sensor may be able to remotely communicate an abnormal operating status of the pump to a smartphone of a property owner indicating a potential for water damage to a foundation.

A "foundation" shall be used herein to refer to the foundation of a structure. The structure may be residential, such as a home; commercial, such as an office building; a storage structure such as a garage; and/or a recreational structure such as a pool, spa or hot tub. The foundation may be considered to include any and all portions of the structure.

The "foundation environment" shall be used herein to refer to anything proximate to the foundation such as, without limitation, the soil, the atmosphere, drain tile(s), a water pipe, a septic tank, a sewage pipe, a pump such as a water, sump, pool, spa or hot tub pump, or a sump pit.

"Equipment" shall be used herein to refer to pipes (e.g., water pipes), tanks (e.g., septic tanks), pumps (e.g., water pumps, sump pumps, pool pumps, spa pumps, hot tub pumps), or other equipment which may include those used to manage water, fluids, sewage or other potential causes of leaks and/or damage to a foundation.

A "sensor" shall be used herein to refer to any device and/or other piece of smart equipment that may be disposed on, inside, underneath, or proximate to a property or foundation and which may provide information related to the foundation, foundation environment and/or equipment. Some examples of "sensors" are, without limitation, moisture sensors, electrical sensors (e.g., voltage, current, capacitance and/or resistance sensors), optical sensors (e.g., a camera), ultrasonic sensors, acoustic sensors, pressure sensors (e.g., hydrostatic pressure), transducers, microelectromechanical sensors (MEMS), chemical sensors, odor/smell sensors, thermal sensors, infrared sensors (IR), location sensors (e.g., GPS, GLONASS), bubblers, floats, and/or any other sensor capable of sensing an environment as is known in the art, especially those which may directly or indirectly sense moisture or water.

An "abnormality" in a foundation, foundation environment, or piece of equipment may be used herein to refer to any type of damage which may render the foundation, foundation environment, or equipment inoperable or unsatisfactory in performing its intended function(s) and/or may create a safety risk to those on the property. This may include a leak, a blockage, a structural abnormality, a draining abnormality, an evaporation abnormality, or an operational abnormality in the foundation environment. For example, damage to a sewage system resulting in a leaking pipe which requires replacement may be a structural abnormality. In another example, a port of a sump pump may be clogged preventing evacuation of pooled water against a foundation which would be considered an operational abnormality of the pump.

The term "repair service provider" as used herein, generally refers to a party and/or entity (e.g., a business and/or other organizational entity) that provides repair services for a customer, e.g., by going to a customer's premises and repairing various pieces of the home's foundation, foundation environment, or equipment, such as heating, ventilating, and air conditioning (HVAC) units, clothes washers, dryers, dish washers, refrigerators, toilets, showers, sinks, sump pumps, pipes, tanks, stoves, ovens, grills, microwaves, electrical outlets, lighting, etc. Further, a repair service provider may be any individual, group of individuals, company, corporation, and/or other type of entity that may perform repair service for customers.

As used herein, the term "property owner" indicates any individual associated with the property, such as a person who owns the property, a family member of the person who owns the property, a person renting/subletting the property, a person living or working on the property, or any other individual that may have an interest in fixing damage to the property.

Further, any reference to "home" is meant to be exemplary and not limiting. The systems and methods described herein may be applied to any property, such as offices, farms, lots, parks, garages, and/or other types of properties or buildings. Accordingly, "homeowner" may be used interchangeably with "property owner." As used herein, "property" may also refer to any buildings, belongings and/or equipment disposed on the property itself.

Exemplary Computer Environment

FIG. 1 depicts an exemplary environment 100 associated with detecting leaks, blockages and/or abnormalities in a foundation or related equipment, such as a home 102, pool 104, septic system 106, or sewage pipe 108. Although FIG. 1 depicts certain entities, components, equipment, and devices, it should be appreciated that additional or alternate entities, components, equipment, and devices are envisioned.

As illustrated in FIG. 1, the environment 100 may include a plurality of sensors 120, any of which may be connected to a local communication network 115. Although FIG. 1 depicts four sensors 120 in the environment 100, it should be appreciated that additional or fewer sensors 120 may be present in other embodiments. In some cases, the foundation, foundation environment, or equipment may be purchased from the manufacturer with the "smart" functionally (e.g., sensors) incorporated therein. In other cases, a "dumb" foundation or equipment may be subsequently modified to add the "smart" functionality to the device. For example, a homeowner may install a "smart" sump pump that is capable of sensing and communicating the flow rate of water through the pump. Alternatively, a flow rate sensor may be added to the port of a "dumb" sump pump which would likewise provide flow rate information.

The plurality of sensors 120 may be configured to communicate with one or more local or remote processors, transceivers, servers and/or sensors 130 via the local communication network 115. The local network 115 may facilitate any type of data communication between devices, equipment, and sensors located on or proximate to the property or foundation via any standard or technology (e.g., Bluetooth®, RFID, X10, UPnP®, IEEE 802 including Ethernet, Wi-Fi, GSM, CDMA, LTE, and/or others). According to present embodiments, the plurality of sensors 120 may transmit to the one or more local or remote processors, transceivers, servers and/or sensors 130 via the local network 115, foundation environment data gathered from sensors 120. The foundation environment data may be collected and/or transmitted continuously or intermittently via the local network 115. The foundation environment data may be audio data, image or video data, or other data. For example, the foundation environment data may indicate the flow rate of water through a pipe 108 pertinent to determining the presence of a leak, blockage, or abnormality.

The one or more local or remote processors, transceivers, servers and/or sensors 130 may analyze the foundation environment data received via the local network 115. The foundation environment data may be analyzed and/or processed locally and/or remotely using algorithms, decision trees, artificial intelligence, machine learning, deep learning, neural networks, and/or any other suitable means, including but not limited to those used to detect, predict and/or determine a leak, blockage and/or abnormality in a foundation, environment, or equipment. The data may be locally or remotely formatted, labeled, weighted, or otherwise processed. Based on the data analysis, the one or more local or remote processors, transceivers, servers and/or sensors 130 may determine that a leak, blockage, or other abnormality exists in the foundation, foundation environment, or equipment. The determination may include actual, potential, or impending damage. Advantageously, the damage may be detected, and the home owner notified of same, with advanced notice before it becomes severe, and/or detected early enough to avoid unnecessary damage, repair and/or costs.

Sensor data from a property may be used for machine learning, as well as data from other sources such as a database, the cloud, sensors on neighboring properties, and/or sensor data received from historical situations, e.g., where a leak, blockage and/or abnormality had occurred. The machine learning may be supervised, unsupervised, semi-supervised or reinforcement learning. An appropriate algorithm and representative data may form a model, which may include but is not limited to, sensor data in this particular case. The data may be labeled, unlabeled, weighted and/or classified. The data may be cleaned and used to train and test the machine learning model. The training data, which may be voluminous, may be analyzed using various machine learning techniques, such as linear regression, polynomial regression, logistic regression, random forests, boosting, nearest neighbors, neural networks, etc. Patterns, inferences, deductions and/or the like may be interpreted from the data and used to create and/or update a machine learning model. Improving performance of the machine learning may also involve changing the model, introducing more variables to augment the efficiency, changing weights applied to the data, and the like. With respect to the current application, one or more statistical models may be generated from various sensor data for determining various types of blockages, leaks and/or other abnormalities in a foundation, environment, pipes and/equipment.

In one aspect, machine learning may be used to identify abnormalities based upon comparing historical sensor data to current sensor data being collected. For example, a machine learning model may be trained with historical data related to rainfall, and associated water table and/or hydrostatic pressures which resulted in foundation damage. A machine learning model may be able to correlate currently measured water table levels and/or hydrostatic pressure measurements proximate a foundation with damage to the foundation based on the training. Further considerations may be taken into account, for example data collected from regions proximate to a property which may experience similar weather patterns or other circumstances may be given more weight than data from other remote regions.

In one aspect, a machine learning model may be trained on data from a biochemical odor sensor 120, such that the model is able to use odor sensor data from air proximate to a septic tank 106 to determine if a septic tank 106 has a leak which results in the surrounding air having a certain chemical signature. In one aspect, an odor sensor 120 proximate to a septic tank 106 may send data related to the chemical composition of the air, and the one or more local or remote processors, transceivers, servers and/or sensors 130 may analyze the biochemical signature of the air from the odor sensor data and determine that the septic tank 106 is leaking and/or provide a notification to the home owner. Absent the sensing system, a home owner may mistake the smell for something less severe and otherwise be unaware of, or ignore, an existing leak.

In another example, sensor 120 may be conductive rods external to a house 102 which are inserted into the surrounding soil to sense a water table level by measuring capacitance and/or resistance between the rods. A machine learning model may be trained with historical water table data collected from capacitance and/or resistance sensors when there was known damage to a foundation, and then be able to assess water table levels that correlate to a likelihood of foundation damage. The one or more local or remote processors, transceivers, servers and/or sensors 130 may through the use of machine learning compare the water table level of a property to a threshold, and based upon the comparison and water table level far exceeding a threshold determined by a machine learning model, notify the home owner there is a severe risk of foundation damage if the water table level is not reduced. The notification may further suggest a corrective action, e.g., evacuating excess water with a sump pump.

The one or more local or remote processors, transceivers, servers and/or sensors 130 may include a program memory 132, a microcontroller or a microprocessor (R) 134, a random-access memory (RAM) 136, a program memory 138, and/or an input/output (I/O) circuit 144, all of which may be interconnected via an address/data bus 140. In some embodiments, the one or more local or remote processors, transceivers, servers and/or sensors 130 may also include, or otherwise be communicatively connected to, a database 142 or other data storage mechanism (e.g., one or more hard disk drives, optical storage drives, solid state storage devices, etc.). The database 142 may be local or remote such as a server or other cloud-based database. The database 142 include data such as property owner contact information, repair service provider information, application screens, web page templates and/or web pages, and other data necessary to interact with property owners, and/or repair service providers through the remote network 125.

It should be appreciated that although FIG. 1 depicts only one microprocessor 134, the one or more local or remote processors, transceivers, servers and/or sensors 130 may include multiple microprocessors 134. Similarly, the memory of the one or more local or remote processors, transceivers, servers and/or sensors 130 may include multiple RAMs 136 and/or multiple program memories 138. Although FIG. 1 depicts the I/O circuit 144 as a single block, the I/O circuit 144 may include a number of different types of I/O circuits. The one or more local or remote processors, transceivers, servers and/or sensors 130 may implement the RAM(s) 136 and/or the program memories 138 as semiconductor memories, magnetically readable memories, and/or optically readable memories, for example.

As shown in FIG. 1, the program memory 138 and/or the RAM 136 may store various applications for execution by the microprocessor 134. For example, a user-interface application may provide a user interface to the one or more local or remote processors, transceivers, servers and/or sensors 130, which user interface may, for example, allow the property owner to view notifications detailing the leak, blockage or abnormality of the foundation or a piece of equipment, view the current status of the foundation, foundation environment, or equipment, or confirm a date and/or time for a scheduled repair of the piece of home equipment, among other things.

According to present embodiments, the one or more local or remote processors, transceivers, servers and/or sensors 130 may be coupled to a database 142 that stores past operational data associated with the equipment as collected by a sensor 120, or otherwise associated with "normal" operating characteristics of the equipment. In some embodiments, the database 142 may organize the past operational data according to which equipment the data is associated. The one or more local or remote processors, transceivers, servers and/or sensors 130 may analyze the operational data to develop a baseline model for normal operation of the equipment. When new operational data is received, the one or more local or remote processors, transceivers, servers and/or sensors 130 may store the new data in the database 142 and then compare the new operational data to the baseline model in order to determine variations from normal operation indicative of abnormal operation of the equipment. The data may also be used by machine learning, which may include to train or retrain a machine learning model used to generate baseline operating characteristics and/or asses abnormal operation of equipment. Any of the organizing, processing, labeling, weighting, analyzing and/or comparing of the data may be carried out using algorithms, decision trees, artificial intelligence, machine learning, deep learning, neural networks, and/or any other suitable means, including but not limited to those used to detect, predict and/or determine a leak, blockage and/or abnormality in a foundation, environment or equipment.

Referring to a sump pump example, the average operating time or flow rate of a sump pump may be drastically decreased under a current heavy rainfall condition as compared to similar historical conditions. The one or more local or remote processors, transceivers, servers and/or sensors 130 may use machine learning to interpret various sensor data associated with a sump pump. The sensor data may include one or more of motor operation data (e.g., time the motor is running, electrical characteristics such as current and/or power draw); vibration data; and/or flow rate data. The various pieces of sensor data may be weighted, for example motor operation data may be the most important indicator of abnormal pump operation and may be given the greatest weight whereas vibration data may be the least indicative of abnormal operation and given the last weight. When the weighted data is considered by the machine learning model, it may be able to determine that the difference between current operational and/or flow rate data received from a sump pump on a property far exceeds historical baseline operating conditions such that it and the pattern indicates abnormal operation of the sump pump, e.g., a motor that was under unusual strain and eventually burnt out. If the pump is not operating properly, this may indicate a likelihood of damage to the foundation proximate to the pump since water which should be evacuated away from a foundation is not being evacuated by the pump. Sensors along the foundation wall may also indicate an abnormally high level of water against the foundation causing increased hydrostatic pressure. Taken together, the various sensor data may cause a machine learning model to determine water damage is occurring to the foundation. Accordingly, the home owner and/or repair service provider may be notified. Additionally, others in the vicinity which may likewise be affected by heavy rainfall condition which in part caused the water damage, and thus may be notified their properties, foundation and/or equipment may face similar issues. The data collected may also be uploaded or otherwise added to a database 142, e.g., the cloud or a blockchain and may be available for others to access, analyze and/or to (re)train a machine learning model.

Although FIG. 1 depicts the database 142 as coupled to the one or more local or remote processors, transceivers, servers and/or sensors 130, it is envisioned that the database 142 may be maintained in the "cloud" such that any element of the environment 100 capable of communicating over either the local network 115 or a remote network 125 may directly interact with database 142.

The one or more local or remote processors, transceivers, servers and/or sensors 130 may also be in communication with one or more client devices 150 associated with the property owner via the remote network 125. The client devices 150 associated with the property owner may include a smartphone (also referred to herein as a "mobile device") 152, a tablet, a laptop 156, a desktop, a smart watch, smart glasses, phablet, smart contact lenses, wearable electronics, augmented reality glasses, virtual reality headset, mixed or extended reality headset or glasses, pager, personal digital assistant, computing device configured for wireless communication, or any other electronic device. The remote network 125 may facilitate any data communication between the one or more local or remote processors, transceivers, servers and/or sensors 130 located on the property and entities or individuals remote to the property via any standard or technology (e.g., GSM, CDMA, TDMA, WCDMA, LTE, EDGE, OFDM, GPRS, EV-DO, UWB, IEEE 802 including Wi-Fi, Ethernet, WiMAX, and/or others).

In some cases, both the local network 115 and the remote network 125 may utilize the same technology. Although FIG. 1 depicts the one or more local or remote processors, transceivers, servers and/or sensors 130 and the client devices 150 in communication via the remote network 125, there are embodiments in which the client devices 150 are on the property and in communication with the one or more local or remote processors, transceivers, servers and/or sensors 130 via the local network 115.

In some embodiments, when the one or more local or remote processors, transceivers, servers and/or sensors 130 determine that a leak, blockage or abnormality has occurred in the foundation, foundation environment, or equipment, the one or more local or remote processors, transceivers, servers and/or sensors 130 may send a property owner one or more notifications describing the leak, blockage or abnormality to or more of the client devices 150 via the local network 115 and/or remote network 125. The property owner notification may include an indication of the location of the foundation, foundation environment, or equipment experiencing the leak, blockage or abnormality, a graphic depiction of the location and/or leak, blockage or abnormality, an indication of a likely cause of the leak, blockage, or abnormality, etc., or any other information gathered, determined or which may otherwise be helpful or informative for the home owner. The information in the notification may be gathered from sensors, e.g., a GPS sensor in the case of informing the owner of the location of an issue or a camera when providing images of a leak, to name but a few.

In some embodiments, the one or more local or remote processors, transceivers, servers and/or sensors 130 may provide information for the property, foundation, foundation environment, and/or equipment on whether or not a leak, blockage or abnormality has been detected. For example, a home owner dashboard may be provided through a webpage or portal which may show the status of equipment or the present readings of sensors on the property, to name but a few.

In some embodiments, the property owner notification may include an indication that the one or more local or remote processors, transceivers, servers and/or sensors 130 has contacted a repair service provider to repair the leak, blockage, or abnormality, and may include user controls for the property owner to confirm an available time for the repair. For example, the property owner notification may include a calendar display with available dates and/or times for the property owner to choose from.

The one or more local or remote processors, transceivers, servers and/or sensors 130 may also be in communication with a repair service provider server 154 via the remote network 125. According to present embodiments, the repair service provider server 154 may include one or more hardware server(s) configured to facilitate the functionalities described herein. In some embodiments, the one or more local or remote processors, transceivers, servers and/or sensors 130 may communicate with several repair service provider servers 154 to select the best repair service provider for the type of repair. For example, the one or more local or remote processors, transceivers, servers and/or sensors 130 may communicate with a first repair service provider when a sump pump stops working and a second repair service provider when a blockage is detected in a sewage pipe.

The one or more local or remote processors, transceivers, servers and/or sensors 130 may obtain contact information for each repair service provider, for example via the databases 138, 142 or by searching the Internet for repair service providers. Moreover, the one or more local or remote processors, transceivers, servers and/or sensors 130 may determine which repair service provider to communicate with based on a set of rules stored in the databases 138, 142, based on user preferences stored in the databases 138, 142, or by searching the Internet for reviews of repair service providers.

It will be appreciated that one or more local or remote processors, transceivers, servers and/or sensors 130 may be provided for the purpose of distributing server load, serving different web pages, etc.

Exemplary Mobile Device

Figure 2:
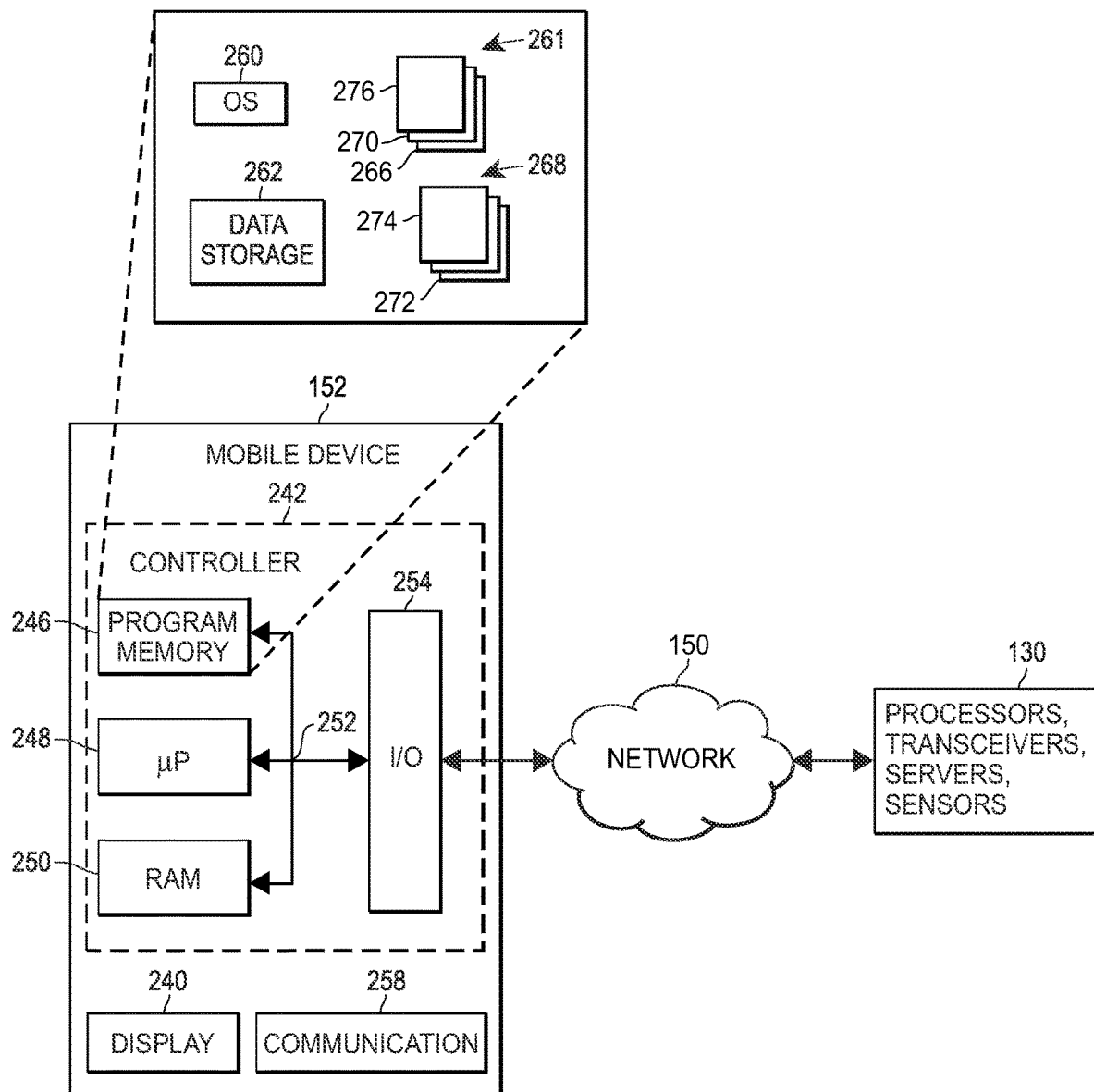
FIG. 2 depicts a block diagram of an exemplary client device.

Referring now to FIG. 2, the mobile device 152 (or any of the client devices) may include a display 240, a communication unit 258, a user-input device (not shown), and a controller 242. Similar to the one or more local or remote processors, transceivers, servers and/or sensors 130, the controller 242 may include a program memory 246, a microcontroller or a microprocessor (µP) 248, a random-access memory (RAM) 250, and/or an input/output (I/O) circuit 254, all of which are interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™ Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the one or more local or remote processors, transceivers, servers and/or sensors 130 through the remote network 125. In some embodiments, the controller 242 may also include, or otherwise be communicatively connected to, other data storage mechanisms (e.g., one or more hard disk drives, optical storage drives, solid state storage devices, etc.) that reside within the mobile device 130.

The communication unit 258 may communicate with the one or more local or remote processors, transceivers, servers and/or sensors 130 via any suitable wireless communication protocol network, such as a wireless telephony network (e.g., GSM, CDMA, LTE, UWB etc.), a Wi-Fi network (802.11 standards), a WiMAX network, a Bluetooth network, etc. The user-input device (not shown) may include a "soft" keyboard that is displayed on the display 240 of the mobile device 152, an external hardware keyboard communicating via a wired and/or a wireless connection (e.g., a Bluetooth keyboard), an external mouse, a touchscreen, a stylus, and/or any other suitable user-input device.

As discussed with reference to the one or more local or remote processors, transceivers, servers and/or sensors 130, it should be appreciated that although FIG. 2 depicts only one microprocessor 248, the controller 242 may include multiple microprocessors 248. Similarly, the memory of the controller 242 may include multiple RAMs 250 and/or multiple program memories 246. Although FIG. 2 depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and/or configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 152.

One of the plurality of applications 264 may be a native application and/or web browser 270, such as Apple's Safari®, Google Android™ mobile web browser, Microsoft Internet Explorer® for Mobile, Opera Mobile™, that may be implemented as a series of machine-readable instructions for receiving, interpreting, and/or displaying application screens or web page information from the one or more local or remote processors, transceivers, servers and/or sensors 130 while also receiving inputs from the user. Another application of the plurality of applications may include an embedded web browser 276 that may be implemented as a series of machine-readable instructions for receiving, interpreting, and/or displaying web page information.

One of the plurality of routines may include a repair service provider display routine 272 that may display information about the repair service provider that is performing the repair and may receive a confirmation from a user of a scheduled date and/or time for the repair. Another routine in the plurality of routines may include a repair scheduling routine 274 that may display a calendar including one or several dates and/or times in which a repair service provider is available to perform a repair and may receive a selection from the user of one of the available dates and/or times for scheduling the repair.

Preferably, a property owner and/or a user may launch the client application 266 from a client device, such as one of the client devices 152, to communicate with the one or more local or remote processors, transceivers, servers and/or sensors 130 to implement the repair scheduling system. Additionally, the property owner and/or the user may also launch or instantiate any other suitable user interface application (e.g., the native application or web browser 270, and/or any other one of the plurality of software applications 264) to access the one or more local or remote processors, transceivers, servers and/or sensors 130 to realize the repair scheduling system. In some embodiments, the client application 266 may launch automatically upon receiving a property owner notification from one or more local or remote processors, transceivers, servers and/or sensors 130 that a leak, blockage, or abnormality has occurred and/or that the failure has been communicated to a repair service provider and repair scheduling has been initiated.

Generally, the term "user" is used when referring to a person who is operating one of the client devices 152 and is not exclusive of the term "property owner."

Measuring Water Pressure on a Foundation

Water pressure builds up over time on home foundations. As such, measuring the water pressure on a foundation provides an indication of whether excess water is pressing up against, and causing damage to, a home. In particular, sensors 120 near a sump pump may allow a user to measure hydrostatic pressure. In one aspect, the data may be processed by a machine learning model trained to interpret sensor data associated with a sump pump and make a determination as the whether or not the sump pump is operating abnormally. If the system determines there is abnormal operation, a homeowner may receive an alert. Similarly, a flow rate sensor 120 at a sump pit, a combination of sensors 120 to determine incoming and outgoing water at the sump pit, or a cleanout port plug with a built-in float installed beneath a floor may each indicate if water is flooding a home 102 and potentially causing water damage. In one aspect, a machine learning model may interpret one or more of the sensor data to determine if an unacceptable level of water is present that would result in damage to a foundation, and the system may alert the homeowner to this.

Performing measurements in the ground near a home 102 may similarly provide an indication of potential water pressure and/or damage to a home, such as analyzing a core sample. One or more sensors 120 may detect various conditions and/or properties of the core sample, such as the composition of sand, silt, minerals, hydration level and/or other properties. The data from the analysis may be processed by a machine learning model trained to detect a potential of water damage from core sample data and provide an indication of same.

In another aspect, conductive rods external to a house 102 may measure a water table level by measuring capacitance and/or resistance between the rods. The data may likewise be interpreted by a machine learning model such that it may be an indicator of impending water ingress due to hydrostatic pressure, for example water against basement walls and/or rising water levels in window wells. Additionally, or alternatively, a septic tank level may be measured, estimated, and/or otherwise determined for those that live in the country and have septic tanks 106. For example, data from sensors 120 proximate a septic tank 106 may be indicative of a leak in the tank 106. In one aspect, a biochemical sensor 120 located on the surface of the septic tank 106 may detect sewage external to the tank. When the sensor data is processed through a machine learning model, the system may determine that the septic tank 106 is leaking.

In further implementations, the system may include an odor sensor 120 for a sewer. Sometimes, a sewer leak may smell similar to a propane leak so a homeowner may have difficulty distinguishing which kind of leak may be occurring. In one aspect, a biochemical sensor 120 may produce data that when processed by a machine learning model is able determine a sewer smell in the air, which may indicate that a sewer pipe 108 is broken and/or malfunctioning leading to sewage seeping into the basement footing tile and/or into the sump pit. Data from sensors 120 proximate the footing tile and/or sump pit may likewise be interpreted by a machine learning model and used to determine if there is a leak in the sewer pipe 108.

In some implementations, other data beyond data from sensors 120 on the property may be considered in a determination of damage to a foundation, a foundation environment and/or equipment. For example, historical rainfall may be used in training a machine learning model. That data may be correlated with sensor data indicating sump evacuation rates during rainfall conditions, and if a sump does not run as often under similar circumstances, a machine learning model may be able to determine a blockage in the sump pump which may result in a risk of flooding and/or damage, e.g., to footing tile.

Similar to the above, an in-ground pool 104 or spa may have pressure pushing against the foundation or may otherwise be leaking without a homeowner's knowledge. As such, implementing sensors 120 to detect the overall incoming and outgoing water in a pool 104 or spa may determine that a leak is present. Similarly, measuring an overall change to the water level in the pool 104 may provide a determination that pool water is being removed faster than evaporation or normal use would explain. For example, a machine learning model may be trained with data indicating normal evaporation rates under various conditions. If a water level sensor 120 in a pool 104 provides data to the system indicating an evaporation rate far outside the normal threshold determined by the model, it may indicate there is a leak in the pool 104 foundation through which water is exiting producing a water level that cannot be attributed to evaporation alone. Moreover, a model may be trained on data related to pools 104 where it was known a leak had occurred and the evaporation and/or water level data was associated with such situations. If pool 104 sensors 120 are providing data which machine learning determines have a similar pattern, the model may also determine a leak has occurred in the pool 104.

In another example, sensors 120 to measure the chemicals present in, and/or the pressure against, the walls of an in-ground pool 104 or spa may similarly provide an indication of potential water damage or leakage. For example, if hydrostatic pressure is specific to a small area of a pool 104 foundation and abnormal to the hydrostatic pressure on rest of the foundation, a machine learning model trained to interpret such data may determine a leak is present in the small area of the pool foundation, and may notify the property owner of the leak.

Figure 3:
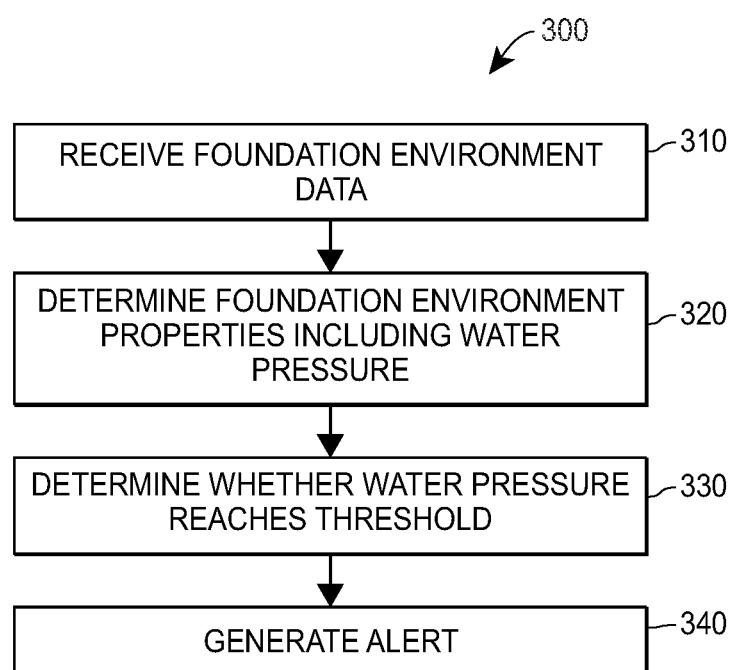
FIG. 3 depicts a flow diagram of an exemplary computer-implemented method of measuring water pressure on a foundation.

In one aspect and as shown in FIG. 3, a computer-implemented method 300 of measuring water pressure on a foundation may be provided. The method 300 may be implemented via one or more local or remote processors, servers, sensors, transceivers 130, memory units, mobile devices 152, wearables, smart glasses, smart watches, augmented reality glasses, virtual reality headset, and/or other electronic or electrical components.

As further shown in FIG. 3, the method 300 may include (1) at step 310 receiving, by one or more processors 130 and from one or more sensors 120, foundation environment data for an environment surrounding the foundation of a structure; (2) at step 320 analyzing, by the one or more processors 130, the foundation environment data to determine one or more properties of the foundation environment, wherein the one or more properties of the foundation environment include at least a foundation water pressure; (3) at step 330 generating, by the one or more processors 130 and based at least upon a determination of whether the foundation water pressure reaches a predetermined threshold, a likelihood of damage to the foundation; and/or (4) at step 340 generating, by the one or more processors 130, an alert based at least upon the likelihood of damage to the foundation.

The foundation may include a structure. The structure may be residential, such as a home 102; commercial, such as an office building; a storage structure such as a garage; and/or a recreational structure such as a pool 104, spa or hot tub.

The foundation environment may include one or more of the foundation itself, including any associated structure built thereupon, as well as parts of the foundation or structure such as a wall or window well. The foundation environment may also include other things proximate the foundation such as the soil, the atmosphere, drain tile(s), a water pipe, a septic tank 106, a sewage pipe 108, a pump such as a water, sump, pool 104, spa or hot tub pump, or a sump pit, to name but a few.

One or more sensors 120 collect foundation environment data and may include any of a number of sensors 120, such as moisture, electrical, optical, ultrasonic, acoustic, pressure including hydrostatic pressure, a transducer, microelectromechanical (MEMS), chemical, odor/smell, thermal, infrared (IR), location such as GPS, a bubbler, a float, capacitance or resistance sensors, or any other sensor 120 capable of sensing an environment as is known in the art, especially those which may directly or indirectly sense moisture or water.

The foundation environment data is received by one or more processors 130 which may be located locally or remotely. Data may be transmitted to and/or between the sensors 120 and processors 130 in a wired manner or wirelessly, such as with Wi-Fi, IR, Bluetooth, cellular, as well as any other manner of communication. The transmission and/or communication may be continuous, intermittent, unidirectional, bidirectional, or carried out in any other suitable manner.

The foundation environment data is analyzed to determine one or more properties of the foundation environment, which includes at least a foundation water pressure, such as the water pressure in, on, under, around and/or proximate the foundation. The analysis may take place locally or remotely by one or more processors, servers, sensors, or any other means of carrying out data analysis. This may further include using algorithms, decision trees, artificial intelligence, machine learning, deep learning and/or neural networks, to name but a few.

The foundation water pressure may include pressure from any of a number of liquids such as potable, drinking or other water which may be piped or otherwise transported into or near the foundation, rainfall, snowmelt, sewage and/or pool, hot tub, or spa water, to name but a few.

Other properties of the foundation environment may be determined as well, which may provide or assist in providing a direct or indirect indication of foundation water pressure. Such properties may include, but are not limited to, chemical composition, core analysis, quantity, humidity, flow rate, level, temperature, capacitance, or resistance, as well as any other measure of an environment which may be indicative of actual, potential, or impending water damage to a foundation.

According to the method 300, based at least upon a determination of whether the foundation water pressure reaches a predetermined threshold, a likelihood of damage to the foundation may be determined. In one aspect, the likelihood of damage may be based upon various conditions detected by the sensor data. For example, a machine learning model may determine a foundation water pressure which is slightly above a threshold indicative of water damage, such that the data may indicate impending or potential damage to the foundation is likely to occur. In another aspect, the sensor data interpreted by the model may indicate a foundation water pressure significantly above a baseline threshold determined by the model, such that it is indicative of actual damage and the likelihood of damage may be one hundred percent. Some of the data that maybe used to train or retrain a machine learning model may be normal baseline water pressure on the foundation of the specific homeowner's property, a threshold which has historically been correlated with water damage for similar properties, and/or data for which a pattern consistent with water damage may be extracted.

A further determination by the one or more processors 130 may include determining a leak, a structural abnormality, a draining abnormality, an evaporation abnormality, and/or an operational abnormality in the foundation environment. For example and in one implementation, a hydrostatic pressure near a sump pump may be determined and may be indicative of whether the sump pump is functioning properly when the data is interpreted by an appropriate machine learning model. In another aspect, a flow rate sensor 120 at a sump pit, or a combination of sensors 120, may determine the rate of incoming and outgoing water at the sump pit which may be interpreted to indicate water damage as discussed above. Sensor data for a cleanout port plug with a built-in float installed beneath a floor may provide data which indicates if water is flooding a home 102, potentially causing water damage. Performing measurements in the soil near a home 102 or foundation, such as analyzing core samples may provide an indication of potential water pressure and/or damage to the home 102 or foundation, as discussed supra. Similarly and as discussed above, conductive rods external to the foundation may measure a water table level by measuring capacitance and/or resistance. This may be an indicator of impending water ingress due to hydrostatic pressure against basement walls and rising levels in window wells.

In another implementation, a septic tank 106 level may be measured, estimated, or otherwise determined which may be valuable for those that live in areas where septic tanks 106 are common, such as in the country. In some implementations, the method may include sensing a sewer smell via an odor sensor 120 (e.g., the odor sensor 120 may identify chemical components in the air which typically come from a sewer) as sometimes a sewer leak may smell similar to a propane leak such that a homeowner may have difficulty distinguishing the smells, but by detecting sewer smell, it may be determined whether a sewage pipe 108 is broken, malfunctioning or has an abnormality. In other implementations, the sewage may seep into the basement footing tile and/or into the sump pit similarly indicating a leak, structural or operational abnormality.

In some implementations, the one or more processors 130 may determine the likelihood of damage to the foundation based upon any suitable combination of the foundation water pressure, the hydrostatic pressure near the sump pump, the flow rate at the sump pit, the water level at the cleanout port plug, the core sample data, the water table level, the sewer smell, etc. For example, the one or more processors 130 may determine a likelihood of damage to the foundation based upon each of these individual factors.

More specifically, the one or more processors 130 may determine a first likelihood of damage to the foundation by comparing the foundation water pressure to a predetermined threshold water pressure. The one or more processors 130 may determine a second likelihood of damage to the foundation by comparing the hydrostatic pressure near the sump pump to a predetermined threshold hydrostatic pressure. The one or more processors 130 may determine a third likelihood of damage to the foundation by comparing the flow rate at the sump pit to a predetermined threshold flow rate. The one or more processors 130 may determine a fourth likelihood of damage to the foundation by comparing the water level at the cleanout port plug to a predetermined threshold water level.

The one or more processors 130 may determine a fifth likelihood of damage to the foundation by analyzing the soil composition of the core sample data. For example, the soil composition may include a mixture of sand, clay, and silt. The one or more processors 103 may identify the percentage of sand, clay, and silt in the soil and may identify the fifth likelihood of damage to the foundation based upon these percentages. For example, the one or more processors 130 may compare the percentage of clay in the soil to a predetermined threshold percentage and may identify the fifth likelihood of damage to the foundation based upon the comparison. In other examples, the one or more processors 130 may assign likelihood scores to each component within the soil based upon the percentage of the component within the soil. As the percentage of clay in the soil increases, the likelihood score may increase. Then the one or more processors 130 may combine the likelihood scores in any suitable manner to generate the fifth likelihood of damage to the foundation.

The one or more processors 130 may determine a sixth likelihood of damage to the foundation by comparing the water table level to a predetermined threshold water table level. Additionally, the one or more processors 130 may determine a seventh likelihood of damage by analyzing the chemical components causing the sewer smell. The one or more processors 130 may identify the percentage of each chemical component in the air and may identify the seventh likelihood of damage to the foundation based upon these percentages. For example, the one or more processors 130 may assign likelihood scores to each component in the air based upon the percentage of the component within the air. As the percentage of hydrogen sulfide in the air increases, the likelihood score may increase. Then the one or more processors 130 may combine the likelihood scores in any suitable manner to generate the fifth likelihood of damage to the foundation.

Then the one or more processors 130 may combine the determined likelihoods in any suitable manner to generate an overall likelihood of damage to the foundation. In some instances, the one or more processors 130 may assign weights to each likelihood of damage for the individual factors and/or may combine the likelihoods according to their respective weights.

In some implementations, the method 300 may include correlating historical rainfall to sump evacuation rates. If the sump does not run as often as it did in the past under similar circumstances, it may be indicative of blockages in the footing tile. Machine learning may be used to process data related to how often a sump pumps runs and under what environmental conditions and provide a determination that the sump pump is experiencing abnormal operation which may be indicative of potential water damage, as discussed in more detail above.

The method 300 may include generating and transmitting an electronic notification detailing the circumstances related to the likelihood of damage to the foundation, such as its location according to the location sensor/GPS, the detected conditions, the determined damage and/or one or more corrective actions to mitigate the impact of the damage to the foundation. The notifications may be one or more of a warning, alert, communication, report, or other indication as is known in the art. This may include audio alerts such as alarms or sirens and visual alerts such as indicator lights. This may also include electronic notification such as a call, text, SMS, message, or email to a telephone, computer, laptop 156, mobile device 152, wearable, augmented reality or virtual reality headset, head-mounted display or device; a notification in the form of message, sound, or vibration via an app for a mobile device 152, smartwatch or wearable, or any other form of alert, warning or notification as is known in the art. The notification may include communicating to a home owner, third party or repair service provider details about the damage. Home owners in the vicinity may be notified as well in case the information may be helpful, such as if they experienced the same weather pattern which may have caused the water damage. The notification may also include transmitting sensor data or other relevant information to a repository such as a database, blockchain or the cloud where it may be accessed by third parties for any of a number of purposes. For example, the data may be used for updating and/or (re)training machine learning models.

The method 300 may further include the use one or more of artificial intelligence, machine learning, a neural network, deep learning, or big data. These, or similar, technologies may be used in whole or in part in any part of the method, including those which include at least one or more sensor(s), processor(s) or data.

In addition to the foregoing, the present embodiments may include various machine learning, blockchain, augmented reality, virtual reality, non-fungible token (NFT), and metaverse embodiments.

Flushable Pill Sensor for Detecting Blockages & Leaks

Figure 4:
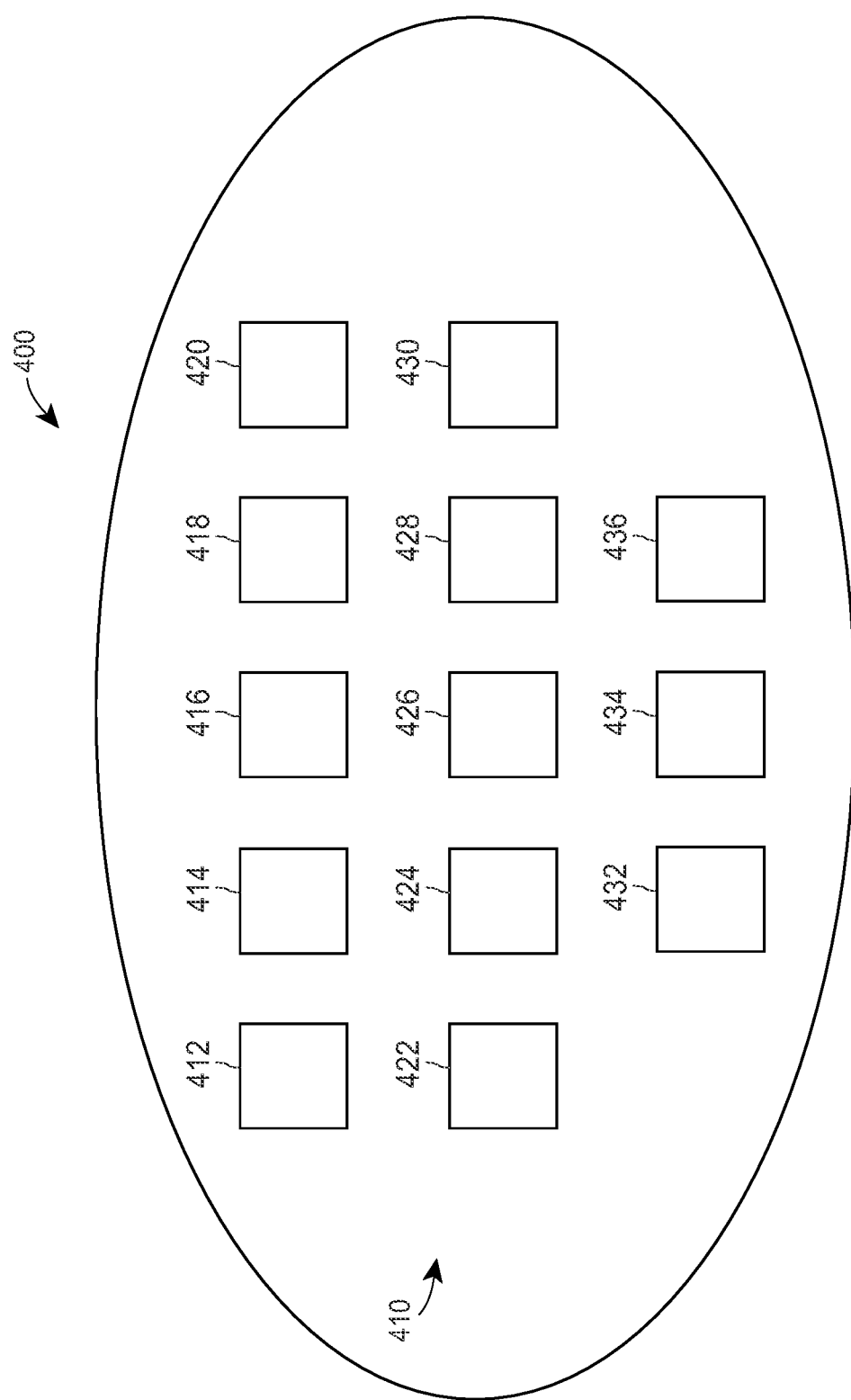
FIG. 4 depicts a block diagram of an exemplary flushable sensor.

As shown in FIG. 4, a waterproof or water-resistant flushable pill sensor 400 may allow a user to detect blockages and/or leaking or broken pipes that a user may not normally be able to inspect.

The pill sensor 400 may be configured for wireless communication and includes one or more processors 420, transceivers 422, sensors 410, which may include a location sensor (e.g., GPS) 412, image sensor (e.g., camera) 414, odor detectors/chemical sensors 424, LIDAR units 426, acoustic units 416, RFID component(s) 428, clocks 430, timers 432, and/or other electronic or electrical components. The sensors 410 may be integrated, attached to, in communication with or otherwise operably connected in any other suitable manner. The pill sensor 400 may be water-resistant, which may include being waterproof.

By using a GPS 412 signal, an RFID 428 indicator, weight sensor 436, etc., in conjunction with sensors 410 installed in sewage systems 108, the system may allow a user to determine a travel time of the flushable pill sensor 400, travel speed of the pill sensor 400, and/or similar characteristics representative of an object traveling through a sewage system 108. Similarly, the addition of a camera 414 or other imaging device to the pill sensor 400 may allow for image feedback to assist in making such determinations.

The pill sensor 400 may also be able to map a piping system 108 using one or more sensors 410. In an aspect, the sensor data collected by the pill sensor 400 while traveling through a piping system 108 may create, validate, and/or update one or more maps of the piping system 108 inside or outside a structure and/or foundation. One or more sensors 410 which the pill sensor 400 may use for the mapping may include an accelerometer, a gyroscope, an inertial measurement unit, GPS 412, a compass, a magnetometer, as well as another other sensor suitable for mapping purposes. In an aspect, as the pill sensor 400 traverses the piping system 108, it may sense deflections (e.g., from a corner or bend in the piping system 108) and use the data from the one or more sensors 410 to directly or indirectly measure various parameters associated with travel and/or mapping, which may include direction, trajectory, speed, acceleration, velocity, location, movement, travel time, and/or travel distance of the pill sensor 400, to name but a few. The sensor data may be processed and/or analyzed by the one or more local or remote processors, transceivers, and/or sensors 130 to create, validate, and/or update one or more maps of the piping system 108. The analysis and/or processing may be carried out using any of algorithms, decision trees, artificial intelligence, machine learning, deep learning and/or neural networks, to name but a few, as well as any other suitable manner of data processing, analysis or the like. In an aspect, the one or more maps may be transmitted electronically to a mobile device 152 of a user or home owner.

The RFID 428 or pill sensor 400 may detect when it was dropped into the toilet or sewer system by sensing conductivity similar to a water alarm. That interactivity may capture the start time. The start time may be appended, tacked onto the end of, or otherwise indicated by the RFID's name. The start time may then be parsed out when the pill sensor 400 is detected by various sensors which may read the RFID 428 along the piping system 108, such as sensors in a municipal sewer station.

Figure 5:
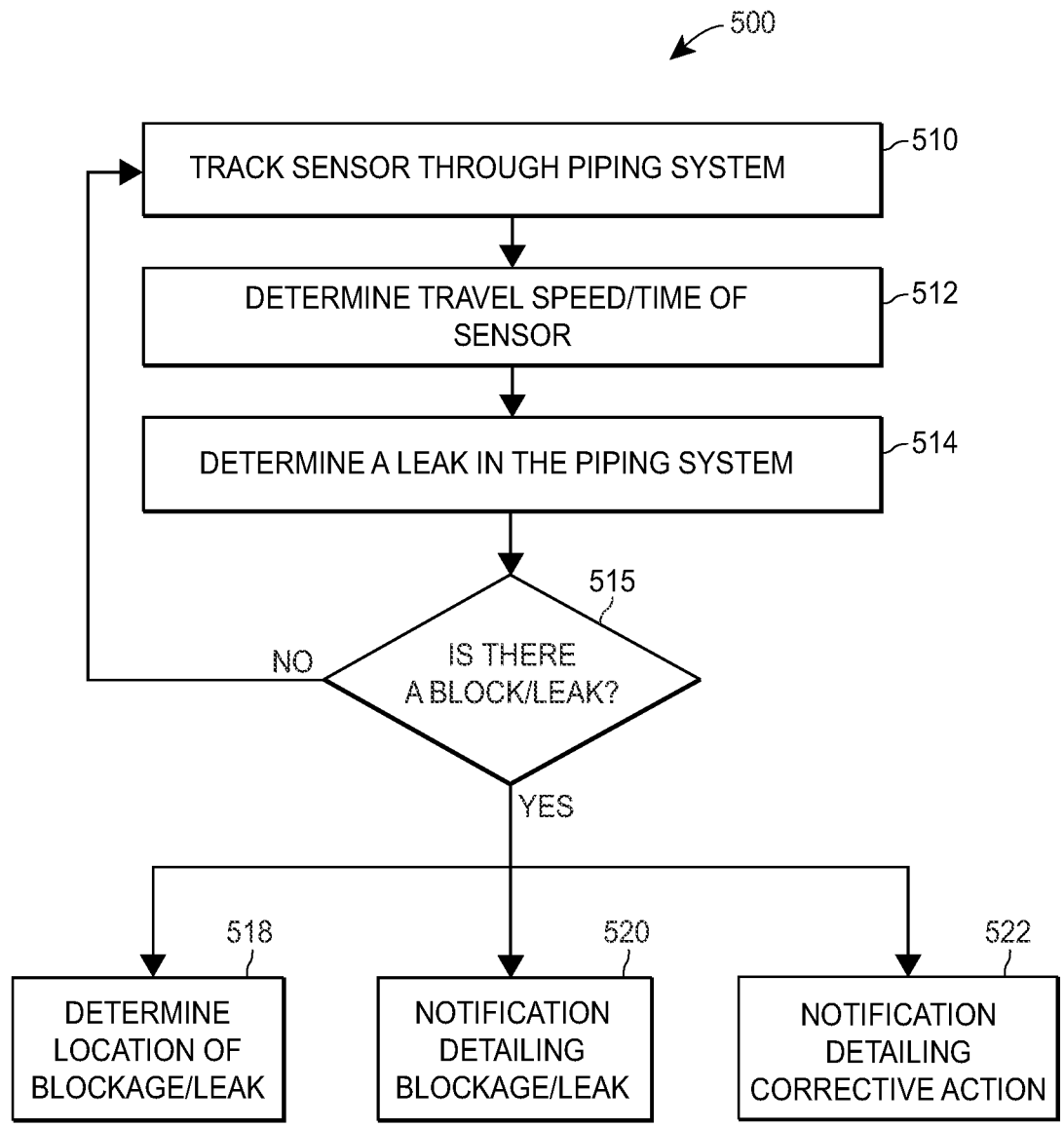
FIG. 5 depicts a flow diagram of an exemplary computer-implemented method for detecting blockages or leaks in piping systems based upon a flushable sensor.

As shown in FIG. 5, a computer-implemented method 500 for detecting blockages or leaks in pipes or piping systems 108 may be provided. The method 500 may be implemented via one or more local or remote processors, servers, sensors, transceivers 130, memory units, cameras, audio recorders, mobile devices 152, spherical robots, robot balls, wearables, smart glasses, smart watches, augmented reality glasses, virtual reality headset, and/or other electronic or electrical components.

In one instance, the method 500 may include at step 510 (1) tracking, via one or more local or remote processors, transceivers, and/or sensors 130, a waterproof or water-resistant sensor (or "pill sensor") 400 traveling through one or more piping systems 108 (and/or tracking the GPS 412 or estimated location of the waterproof or water-resistant sensor 400 as it travels through the one or more piping systems 108); at step 512 (2) estimating, calculating, or otherwise determining, via the one or more local or remote processors, transceivers, and/or sensors 130, a travel speed and/or travel time of the pill sensor 400 through the one or more piping systems 108; at step 514 (3) determining or detecting, via the one or more local or remote processors, transceivers, and/or sensors 130, that a blockage or leak in the one or more piping systems 108 exists based upon the pill sensor 400 (i) travel speed, (ii) travel time, (iii) movement (or lack thereof) through the one or more piping systems 108, (iv) images, (v) audio or acoustic data sets, or (vi) other data sets; and/or at step 516 (4) if a blockage or leak exists: at step 518 (a) determining, estimating, or detecting, via the one or more local or remote processors, transceivers, and/or sensors 130, a location of the blockage or leak in the one or more piping systems 108 exists; at step 520 (b) generating and transmitting, via the one or more local or remote processors, transceivers, and/or sensors 130, an electronic notification detailing the blockage or leak, and its location, to a mobile device 152 of a user or home owner; and/or at step 522 (c) generating and transmitting, via the one or more local or remote processors, transceivers, and/or sensors 130, an electronic notification detailing one or more corrective actions to mitigate the impact of the blockage or leak to a mobile device 152 of a user or home owner. The method 500 may include additional, less, or alternate actions, including those discussed elsewhere herein.

The corrective action of step 522 may be associated with clearing the blockage in the one or more piping systems 108. The corrective action may be associated with fixing the leak in the one or more piping systems 108 and/or a broken or leaking pipe 108.

The method 500 may include receiving, via the one or more local or remote processors, transceivers, and/or sensors 130, images of the blockage, or one or more blockages, in the one or more piping systems 108 from the pill sensor 400.

The method 500 may include receiving, via the one or more local or remote processors, transceivers, and/or sensors 130, images of the leak, or one or more leaks, in the one or more piping systems 108 from the pill sensor 400.

The method 500 may include receiving, via the one or more local or remote processors, transceivers, and/or sensors 130, photographic images of the one or more leaks in the one or more piping systems 108 taken by a camera 414 located on the pill sensor 400. The method 500 may include receiving, via the one or more local or remote processors, transceivers, and/or sensors 130, radar-related or acoustic-related (e.g., sonar-related) images of the leak, or one or more leaks, in the one or more piping systems 108 taken or acquired by one or more radar 418 or acoustic 416 units located on the pill sensor 400.

The method 500 may include (i) receiving, via the one or more local or remote processors, transceivers, and/or sensors 130, a GPS 412 speed, location, and acceleration of the pill sensor 400; and/or (ii) determining or detecting, via the one or more local or remote processors, transceivers, and/or sensors 130, a blockage or leak in the one or more piping systems 108 using the GPS 412 speed, location, and/or acceleration of the pill sensor 400.

The method 500 may include (i) receiving, via the one or more local or remote processors, transceivers, and/or sensors 130, one or more of a direction, trajectory, speed, acceleration, velocity, location, movement, travel time, or travel distance of the pill sensor 400; and (ii) generating and transmitting, via the one or more local or remote processors, transceivers, and/or sensors 130, one or more maps of the one or more piping systems 108 to a mobile device 152 of a user or home owner.

In one embodiment, the data from one or more sensors 410 may be considered in determining the existence and/or location or a leak, blockage, or damage. The data may be processed and/or analyzed by the one or more local or remote processors, transceivers, and/or sensors 130. The analysis and/or processing may be carried out using any of algorithms, decision trees, artificial intelligence, machine learning, deep learning and/or neural networks, to name but a few, as well as any other suitable manner of data processing, analysis or the like.

In one aspect, one or more images may be taken by one or more sensors 410 associated with the pill sensor 400, such as image sensor (e.g., camera) 414, LIDAR 426 and/or, acoustic units 416 (e.g., SONAR), to name but a few. The data from one or more of these sensors 410 may be processed and/or transmitted locally and/or remotely, such that an image of the environment of the pill sensor 400 may be captured. In one aspect, the pill sensor 400 may transmit photographs or video from a camera 414 as it traverses a piping system 108. The data may be fed into a machine learning model which is trained to detect blockages, leaks, cracks or other abnormalities related to a piping system 108 based upon the images.

In one aspect, images provided by the pill sensor 400 are compared by a machine learning model to known images (e.g., images used in training the model) of blockages to determine similarities which may indicate a blockage has been imaged.

In one aspect, the determination by the machine learning model may consider various types of sensor data. For example, if the system determines a likelihood that a blockage has been detected based upon images provided by the pill sensor 400 and the system also determines the pill sensor 400 has not changed location in the piping system 108 over a threshold course of time, the system may apply various weights to the location and image data and determine that the pill sensor 400 is stuck in the piping system 108 behind a blockage. The system may then alert a user to any abnormalities, including blockages, cracks and/or leaks, it has detected.

In one aspect, the location of pill sensor 400 may be known by tracking its location using the aforementioned RFID 428 which may include the time it was dropped into a piping system 108. The RFID 428 may be read by a sensor in the piping system 108 that is in a known location, and once detected by a sensor in a known location, the location of the pill sensor 400 will likewise be known. Tracking the pill sensor 400 using its GPS sensor 412 may alternatively, or additionally, allow the system to track the location of the pill sensor 400.

Additionally, or alternatively, various other metrics may be determined based upon the RFID 428 and/or GPS 412, such as speed and/or velocity of the pill sensor 400 since a time in the piping system 108 and a distance traversed through the piping system 108 will both be known by such sensor data, as discussed above. This data may likewise be used to determine blockages, cracks and/or leaks, e.g., slower velocity through a section of pipe 108 may indicate a partial blockage exists.

In one embodiment, the method may include generating and transmitting, via the one or more local or remote processors, transceivers, and/or sensors 130, an electronic notification detailing one or more corrective actions to mitigate the impact of the blockage or leak to a mobile device 152 of a user, home owner, third party and/or service repair provider. The notification may take any of a number of various forms, such as a call, a text, an e-mail, a notification in an app, or any other suitable electronic notification. The corrective action may be associated with clearing the blockage in the one or more piping systems 108, fixing the leak in the one or more piping systems 108 and/or fixing a broken or leaking pipe 108, as well as any other suitable corrective action related to a leak, blockage or damage of pipes.

In another aspect, a computer system for detecting blockages or leaks in pipes or piping systems 108 may be provided. The computer system may include one or more local or remote processors, servers, sensors, transceivers 130, memory units, cameras, audio recorders, mobile devices 152, spherical robots, robot balls, wearables, smart glasses, smart watches, augmented reality glasses, virtual reality headset, and/or other electronic or electrical components. In one instance, the computer system may include one or more local or remote processors, transceivers, and/or sensors 130; and one or more waterproof or water-resistant sensors (or "pill sensors") 400. The one or more local or remote processors, transceivers, and/or sensors 130 may be configured to (1) track a waterproof or water-resistant sensor (or "pill sensor") 400 traveling through one or more piping systems 108 (and/or track the GPS 412 or estimated location of the waterproof or water-resistant sensor 100 as it travels through the one or more piping systems 108); (2) estimate, calculate, or determine a travel speed and/or travel time of the pill sensor 400 through the one or more piping systems 108; (3) determine or detect that a blockage or leak in the one or more piping systems 108 exists based upon the pill sensor 400 (i) travel speed, (ii) travel time, (iii) movement (or lack thereof) through the one or more piping systems 108, (iv) images, (v) audio or acoustic data, or (vi) other data sets; and/or (4) if a blockage or leak exists: (a) determine or detect a location of the blockage or leak in the one or more piping systems 108 exists; (b) generate and transmit an electronic notification detailing the blockage or leak, and its location, to a mobile device 152 of user or home owner; and/or (c) generate and transmit an electronic notification detailing one or more corrective actions to mitigate the impact of the blockage or leak to a mobile device 152 of user or home owner. The computer system may be configured to include additional, less, or alternate functionality, including that discussed elsewhere herein.

For instance, the waterproof or water-resistant pill sensor 400 may be configured for wireless communication and may include one or more processors 420, transceivers 422, sensors 410, GPS units 412, cameras 414, LIDAR units 426, acoustic units 416, RFID component(s) 428, recorders 434, clocks 430, timers 432, odor detectors/sensors 424, and/or other electronic or electrical components. The sensors 410 may be integrated, attached to, in communication with or otherwise operably connected in any suitable manner.

The one or more local or remote processors, transceivers, and/or sensors 130 further may be configured to receive images of the blockage, or one or more blockages, in the one or more piping systems 108 from the pill sensor 400. The one or more local or remote processors, transceivers, and/or sensors 130 may further be configured to receive images of the leak, or one or more leaks, in the one or more piping systems 108 from the pill sensor 400. This may include photographic images of the leak, or one or more leaks, in the one or more piping systems 108 taken by a camera 414 located on the pill sensor 400. The one or more local or remote processors, transceivers, and/or sensors 130 further may be configured to additionally and/or alternatively receive radar-related or acoustic-related (e.g., sonar-related) images of the leak, or one or more leaks, in the one or more piping systems 108 taken or acquired by one or more radar 418 or acoustic 416 units located on the pill sensor 400.

In one aspect, a camera 414 located on the pill sensor 400 may transmit video recorded in the piping system 108 to a user of the system, which may be viewed on a mobile device 152, such as a smartphone, or augmented reality head-mounted display. In an example where a blockage may be detected, the user may be a repair service provider, and providing a video recorded taken by the flushable pill sensor 400 in the piping system 108 may provide an improved sense and context of the issue than would otherwise be had with their usual tools used to investigate a problem and may advantageously alleviate the need for them to do any investigating of the issue at all.

The one or more local or remote processors, transceivers, and/or sensors 130 further may be configured to (i) receive a GPS 412 speed, location, and acceleration of the waterproof or water-resistant sensor (or pill sensor) 400; and/or (ii) determine, detect, or estimate a blockage or leak in the one or more piping systems 108 using the GPS 412 speed, location, and/or acceleration of the pill sensor 400. The determination by the one or more local or remote processors, transceivers, and/or sensors 130 may be carried out in whole or in part using algorithms, decision trees, artificial intelligence, machine learning, deep learning, neural networks and the like.

In one embodiment, the system may determine or detect that a blockage or leak in the one or more piping systems 108 exists based upon the waterproof or water-resistant sensor 400 (i) travel speed, (ii) travel time, (iii) movement (or lack thereof) through the one or more piping systems 108, (iv) images, (v) audio or acoustic data, or (vi) other data sets. Similarly, the determination by the one or more local or remote processors, transceivers, and/or sensors 130 may be carried out in whole or in part using algorithms, decision trees, artificial intelligence, machine learning, deep learning, neural networks and the like. For example, a machine learning model may receive a number of the aforementioned data and detect pattern which may be indicative of a blockage, e.g., excess travel time and slower than average travel speed, as discussed supra. In one embodiment, this determination may be made based upon comparing, analyzing and/or otherwise processing the data gathered by the pill sensor 400 and the data provided to a machine learning model which has been trained to spot a pattern, correlation, or otherwise make a determination which may indicate a blockage.

In one aspect, the system may receive one or more of a direction, trajectory, speed, acceleration, velocity, location, movement, travel time, or travel distance of the pill sensor 400 and generate and transmit one or more maps of the one or more piping systems 108 to a mobile device 152 of a user or home owner.

If a blockage or leak exists, it's location in the piping system 108 may be determined and provided to a user, home owner, repair service provider and/or other third-party via an electronic notification, which may also contain other details regarding the blockage or leak, e.g., pictures, or other information which may have been gathered by the flushable pill sensor 400 and/or system. The electronic notification may be transmitted to a mobile device 152, such as a computer or smartphone, of the user, home owner, repair service provider and/or other third-party. Advantageously, in some embodiments, the electronic notification may include one or more corrective actions which may be taken to mitigate the impact of the blockage or leak. The corrective actions may be determined in whole or in part using algorithms, decision trees, artificial intelligence, machine learning, deep learning, neural networks and the like. For example, one or more corrective actions may be taken if a pipe 108 is leaking and/or broken, such as patching the breakage or replacing the pipe 108 entirely. Advantageously, based on the data gathered by the flushable pill sensor 400, artificial intelligence may propose that the best course of action to correct the issue is to replace the pipe 108 rather than patch it, which would save time money and/or effort on the part of the home owner and/or repair service provider.

In one embodiment, any and/or all of the data gathered by the flushable pill sensor 400 may be provided to a database and/or blockchain. This may be done for any of a number of suitable purposes, which may include but are not limited to, using the data to improve, train or retrain the system of the home owner or similar systems.

In addition to the foregoing, the present embodiments may include various machine learning, blockchain, augmented reality, virtual reality, non-fungible token (NFT), and metaverse embodiments.

Exemplary Robot Ball Blockage & Leak Detection Device

Figure 6:
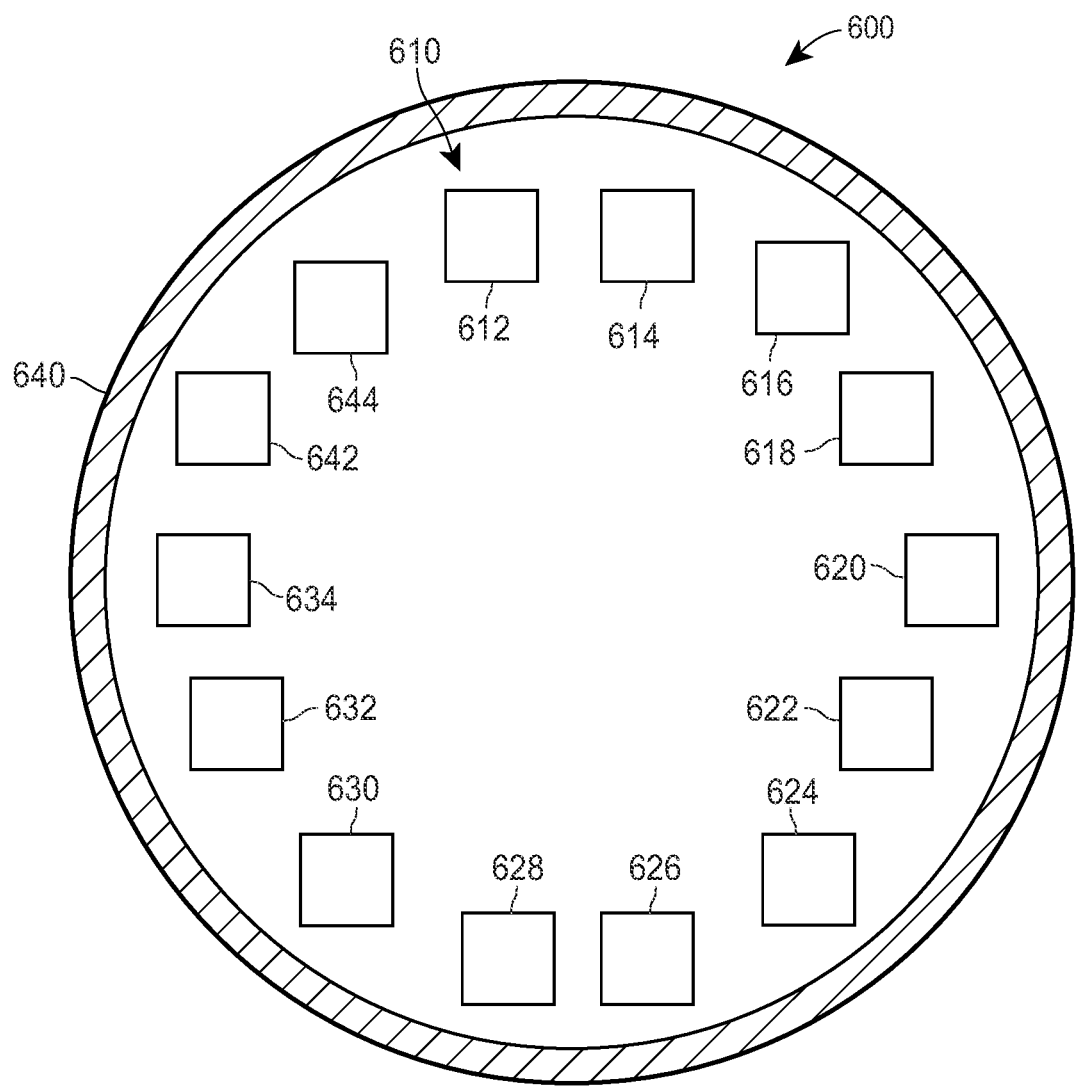
FIG. 6 depicts a block diagram of an exemplary robot ball sensor.

FIG. 6 depicts a block diagram of an exemplary robot ball sensor. Often to detect blockages in a foundation, a user must hire a repair service provider to dig up a foundation and insert a scope for inspection. However, a robotic ball 600 may be able to provide a similar inspection for significantly less disruption and cost. The robot 600 may be spherical, such that it may more easily navigate corners and explore the foundation. Advantageously, providing rubberized ribs 640 along the exterior of the robot ball 600 may allow for the robot ball 600 to independently clear out and/or ram through a blockage. Similarly, the robot ball 600 may include a pressure washer 642, which may allow the robot ball 600 to guide water and rinse out areas underneath a house 102 without extensive work. The root ball 600 may be water-resistant, which may include being waterproof. The robot ball 600 may additionally determine that more extensive work to clear one or more blockages may be required and may additionally or alternatively, transmit a report to the user before returning to a starting position.

In one example, the robot ball 600 may be configured for wireless communication and includes one or more processors 632, transceivers 612, sensors 610, GPS units 614, cameras 616, LIDAR units 618, acoustic units 620, RFID component(s) 622, clocks 624, timers 626, recorder 628, odor detectors/sensors 630, and/or other electronic or electrical components. The sensors may be integrated with, attached to, in communication with or otherwise operably connected to the robot ball 600 in any suitable manner.

Figure 7:
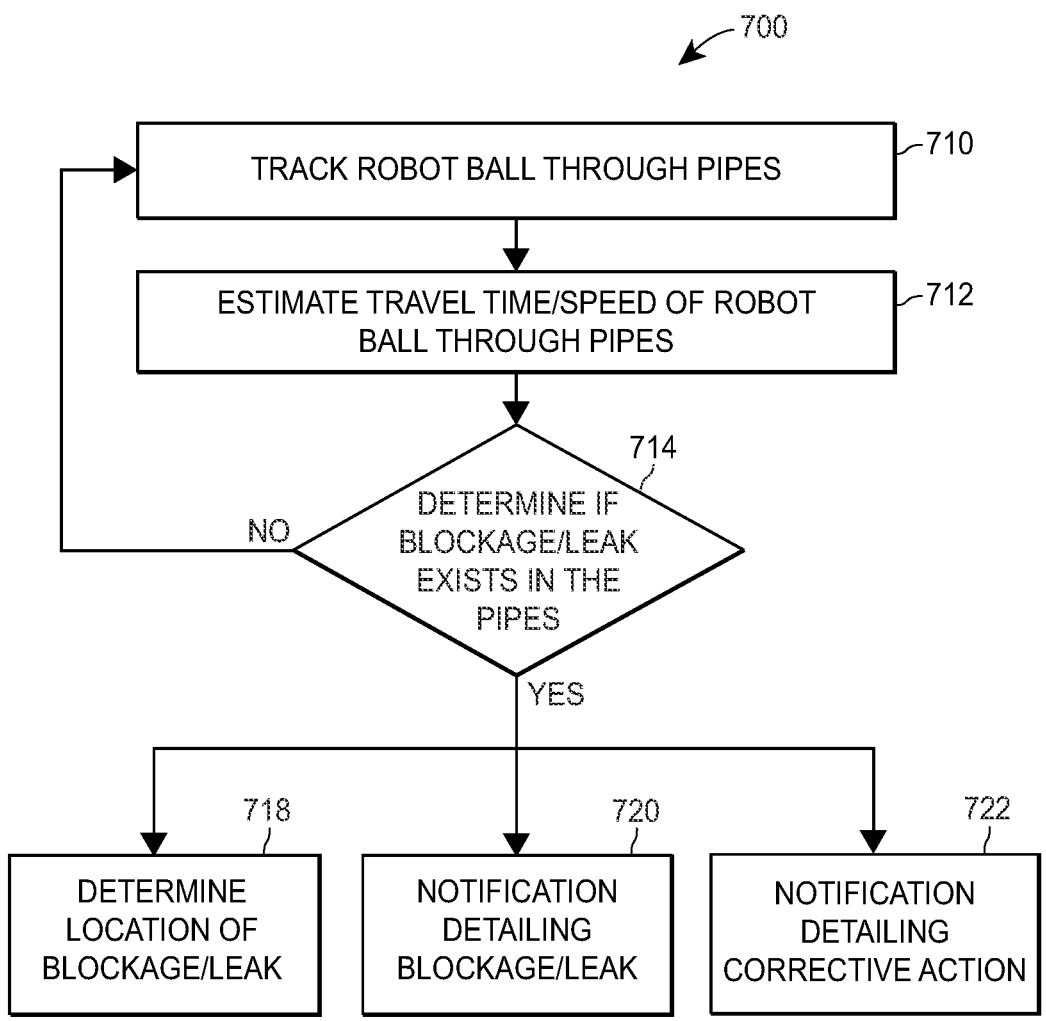
FIG. 7 depicts a flow diagram of an exemplary computer-implemented method for detecting blockages or leaks in piping systems based upon a robot ball sensor.

In one aspect as shown in FIG. 7, a computer-implemented method 700 of detecting blockages or leaks in piping systems or pipes 108 may be provided. The method 700 may be implemented via one or more local or remote processors, servers, sensors, transceivers 130, memory units, cameras, audio recorders, mobile devices 152, spherical robots/robot balls 600, wearables, smart glasses, smart watches, augmented reality glasses, virtual reality headset, and/or other electronic or electrical components.

According to method 700, step 710 includes (1) tracking, via one or more local or remote processors, transceivers, and/or sensors 130, a water-resistant spherical robot or robot ball (or "robot ball") 600 traveling through one or more piping systems 108 (and/or tracking the GPS 614 or estimated location of the robot ball 600 as it travels through the one or more piping systems 108); according to step 712 (2) estimating, retrieving, or determining, via the one or more local or remote processors, transceivers, and/or sensors 130, a travel speed and/or travel time of the robot ball 600 through the one or more piping systems 108; according to step 714 (3) determining or detecting, via the one or more local or remote processors, transceivers, and/or sensors 130, that a blockage or leak in the one or more piping systems 108 exists based upon the robot ball 600 (i) travel speed, (ii) travel time, (iii) movement (or lack thereof) through the one or more piping systems 108, (iv) images or image data, (v) audio or acoustic data, (vi) odor data, or (vii) other data sets; and/or according to step 716 (4) if a blockage or leak exists: according to step 718 (a) determining or detecting, via the one or more local or remote processors, transceivers, and/or sensors 130, a location of the blockage or leak in the one or more piping systems 108 exists; according to step 720 (b) generating and transmitting, via the one or more local or remote processors, transceivers, and/or sensors 130, an electronic notification detailing the blockage or leak, and its location, to a mobile device 152 of user or home owner; and/or according to step 722 (c) generating and transmitting, via the one or more local or remote processors, transceivers, and/or sensors 130, an electronic notification detailing one or more corrective actions to mitigate the impact of the blockage or leak to a mobile device 152 of user or home owner. The method may include additional, less, or alternate actions, including those discussed elsewhere herein.

The corrective action may be associated with clearing the blockage in the one or more piping systems 108, fixing a leak in the one or more piping systems 108 and/or a fixing a broken pipe 108. The corrective action may include using, directing, or moving the robot ball 600 to clear all or some of the blockage, such as by removing or collecting sediment or other buildup within the piping system 108. In one example, using, directing, or moving the robot ball 600 may include directing or maneuvering the robot ball 600 via a remote controller. The remote controller may provide direction from a user. In another example, the robot ball may be "smart" or have the capability to move autonomously and/or semi-autonomously without manual intervention or a remote controller (e.g., navigation is provided by the electronics on the robot ball itself). The ability to move autonomously and/or semi-autonomously may be provided with the use algorithms, decision trees, artificial intelligence, machine learning and/or neural networks, as well as any other computerized manner suitable to direct autonomous and/or semi-autonomous movement. In another example, the robot ball may include a camera which can live-stream its movement to user who may control the robot ball 600 based upon the video feed. The video feed may be transmitted to a mobile device 152 such as a smartphone or augmented reality head-mounted display.

The method 700 may further include receiving from the robot ball 600, via the one or more local or remote processors, transceivers, and/or sensors 130, images of one or more of a blockage, a leak, or a break in the one or more piping systems 108. The images may be provided by the robot ball 400 camera 616 and may include photographs and/or video. The images may be transmitted to a mobile device 152 such as a smartphone or augmented reality head-mounted display. Advantageously, the images may provide the recipient, which may be owner or repair service provider, situation awareness and perspective of the issue or damage which may otherwise not be possible with traditional investigative tools (e.g., a scope) and/or may save time, money and effort investigating the problem.

The method 700 may also include receiving from the robot ball 600, via the one or more local or remote processors, transceivers, and/or sensors 130, radar-related or acoustic-related (e.g., sonar-related) images of a blockage, a leak, or a break in the one or more piping systems 108 taken or acquired by one or more radar 634 or acoustic 620 units included on the robot ball 600. Any and/or all of the various types of images may be taken continuously by the sensors 610, at specific intervals, only when directed by a user, and/or autonomously based on local or remote intelligence, such as artificial intelligence or machine learning.

The method 700 may further include (i) receiving, via the one or more local or remote processors, transceivers, and/or sensors 130, a GPS 114 speed, location, and acceleration of the robot ball 600; and/or (ii) determining, via the one or more local or remote processors, transceivers, and/or sensors 130, a blockage, leak or break in the one or more piping systems 108 using the GPS 614 speed, location, and/or acceleration of the robot ball 600. The determination of speed, location, and acceleration by the one or more local or remote processors, transceivers, and/or sensors 130 may be carried out through the use of artificial intelligence, machine learning, and/or neural networks. Similarly, the determination of a blockage, leak or break by the one or more local or remote processors, transceivers, and/or sensors 130 may be carried out through the use of artificial intelligence, machine learning, and/or neural networks.

In one aspect, one or more images may be taken by one or more sensors associated with the robot ball 600, such as image sensor (e.g., camera) 616, LIDAR 618 and/or, acoustic units 620 (e.g., SONAR), to name but a few. The data from one or more of these sensors 610 may be processed and/or transmitted locally and/or remotely, such that an image of the environment of the robot ball 600 may be captured. In one aspect, the robot ball 600 may transmit photographs or video from a camera 616 as it traverses a piping system 108. The data may be fed into a machine learning model which is trained to detect blockages, leaks, cracks or other abnormalities related to a piping system 108 from the images.

In one aspect, images provided by the robot ball 600 are compared by a machine learning model to known images (e.g., images used in training the model) of blockages to determine similarities which may indicate a blockage has been imaged.

In one aspect, the determination by the machine learning model may consider various types of sensor data. For example, if the system determines a likelihood that a blockage has been detected based upon images provided by the robot ball 600 and/or the system also determines the robot ball 600 has not changed location in the piping system 108 over a threshold course of time, the system may apply various weights to the location and image data and determine that the robot ball 600 is stuck in the piping system 108 behind a blockage. The system may then alert a user to any abnormalities, including blockages, cracks and/or leaks, it has detected.

In one aspect, the location of the robot ball 600 may be known by tracking its location using the aforementioned RFID 622. The RFID 622 may be read by a sensor in a known location, such as a sensor in the piping system 108, and once the robot ball 600 is detected by a sensor in a known location, the location of the robot ball 600 will likewise be known. Tracking the robot ball 600 using its GPS sensor 614 may alternatively, or additionally, allow the system to track the location of the robot ball 600.

Additionally, or alternatively, various other metrics may be determined based on the RFID 622 and/or GPS 614, such as speed and/or velocity of the robot ball 600 since a time in the piping system 108 and a distance traversed through the piping system 108 will both be known by such sensor data, as discussed above. In one embodiment, the robot ball 600 may be manually controlled, remotely controlled, autonomous, and/or autonomously controlled and the method 700 may include (i) directing, via the one or more local or remote processors, transceivers, and/or sensors 130, the robot ball 600 to travel autonomously to a specific location, such as location of a suspected or actual blockage or leak in the one or more piping systems 108; and/or (ii) directing, via the one or more local or remote processors, transceivers, and/or sensors 130, the robot ball 600 to acquire more images, audio, or other data sets, associated with a blockage or leak in the one or more piping systems 108. For example, the one or more local or remote processors, transceivers, and/or sensors 130 may transmit control signals to the propulsion mechanism within the robot ball 600 such as the motors to cause the robot ball 600 to travel to the specific location.

Figure 8:
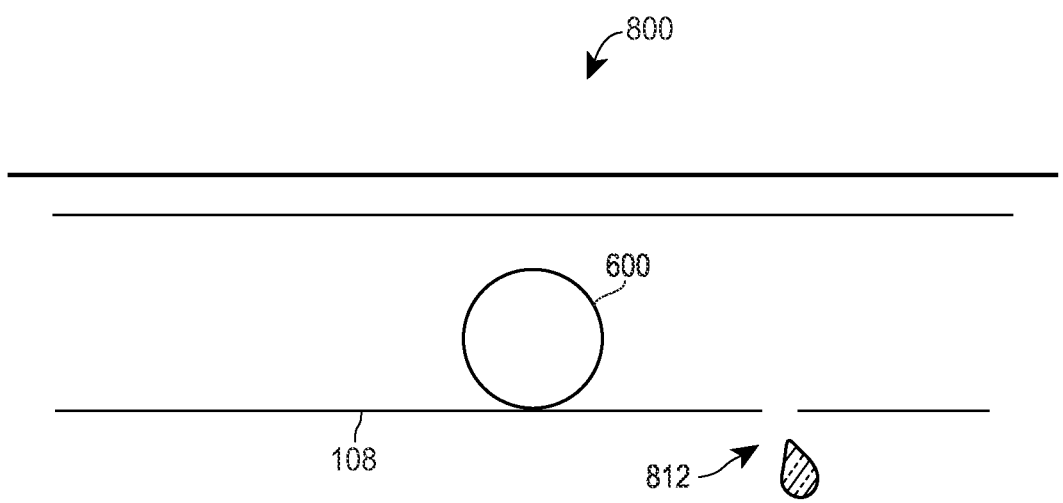
FIG. 8 depicts a block diagram of an exemplary computer system for detecting blockages or leaks in piping systems based upon a robot sensor.

In another aspect as shown in FIG. 8, a computer system 800 for detecting blockages or leaks 812 in pipes or piping systems 108 may be provided. The computer system 800 may include one or more local or remote processors, servers, sensors, transceivers 130, memory units, cameras, audio recorders, mobile devices 152, spherical robots/robot balls 600, wearables, smart glasses, smart watches, augmented reality glasses, virtual reality headset, and/or other electronic or electrical components.

In one instance, the computer system 800 may include one or more local or remote processors, transceivers, and/or sensors 130; and one or more robot balls or spherical robots ("robot balls") 600. The one or more local or remote processors, transceivers, and/or sensors 130 may be configured to (1) track a robot ball 600 traveling through one or more piping systems 108 (and/or track the GPS 614 or estimated location of the robot ball 600 as it travels through the one or more piping systems 108); (2) estimate, retrieve, or determine a travel speed and/or travel time of the robot ball 600 moving through the one or more piping systems 108; (3) determine or detect that a blockage or leak 812 in the one or more piping systems 108 exists based upon the robot ball 600 (i) travel speed, (ii) travel time, (iii) movement (or lack thereof) through the one or more piping systems 108, (iv) images or image data, (v) audio or acoustic data, (vi) odor data, or (vii) other sensor data; and/or (4) if a blockage or leak 812 exists: (a) determine or detect a location of the blockage or leak 812 in the one or more piping systems 108 exists; (b) generate and transmit an electronic notification detailing the blockage or leak 812, and its location, to a mobile device 152 of user or home owner; and/or (c) generate and transmit an electronic notification detailing one or more corrective actions to mitigate the impact of the blockage or leak 812 to a mobile device 152 of user or home owner. The computer system 800 may be configured with additional, less, or alternate functionality, including that discussed elsewhere herein.

For instance, the robot ball 600 may be configured for wireless communication and includes one or more processors 632, transceivers 612, sensors 610, GPS units 614, cameras 616, LIDAR units 618, acoustic units 620, RFID component(s) 622, data or other recorders 628, clocks 624, timers 626, odor detectors/sensors 630, and/or other electronic or electrical components. The robot ball 600 may be configured for remote manual control of robot ball 600 movement (such as via a remote controller), and/or autonomous movement directed by the one or more local or remote processors 130.

The corrective action may be associated with clearing the blockage in the one or more piping systems 108 such as using or moving the robot ball to clear all or some of the blockage, removing or collecting sediment or other buildup within the piping system 108, which may include spinning the ball and its outer ribs against a blockage, or using the robot ball sprayer on the blockage. The corrective action may be associated with fixing the leak 812 in the one or more piping systems 108 and/or a broken or leaking pipe 812. The one or more local or remote processors, transceivers, and/or sensors 130 further may be configured to receive images of the blockage, or one or more blockages, in the one or more piping systems 108 from the robot ball 600.

The one or more local or remote processors, transceivers, and/or sensors 130 further may be configured to receive images of the leak 812, or one or more leaks 812, in the one or more piping systems 108 from the robot ball 600. The one or more local or remote processors, transceivers, and/or sensors 130 further may be configured to receive photographic images of the leak 812, or one or more leaks 812, in the one or more piping systems 108 taken by a camera 616 located on the robot ball 600. The one or more local or remote processors, transceivers, and/or sensors 130 further may be configured to receive radar-related or acoustic-related (e.g., sonar-related) images of the leak 812, or one or more leaks 812, in the one or more piping systems 108 taken or acquired by one or more radar 634 or acoustic 620 units located on the robot ball 600.

The one or more local or remote processors, transceivers, and/or sensors 130 further may be configured to receive a GPS 614 speed, location, and acceleration of the robot ball 600; and/or determine a blockage or leak 812 in the one or more piping systems 108 using the GPS 614 speed, location, and/or acceleration of the robot ball 600 (such as determining the robot ball 600 speed is less than expected for a portion of the piping system 108 that the robot ball 600 is currently traveling through).

In one example, a homeowner places robot ball 600 in sump inlet pipe. Robot ball 600 crawls the basement footing tile to clear debris and give a report on clogs and/or water pooling. Debris may be cleared by the ball 600 spinning fast and the ribs 640 scraping against the clog. An ovalish "pill" variant could navigate with two side half-spheres where the center contains a camera 616 and digging mechanism 642 such as water jet for cleanout. The robot 600 could also or alternatively use a backward spray of water as a method for forward propulsion.

While the previous disclosure mentions the robot ball 600 inspecting a foundation, for clarification, additionally or alternatively, this may include inspecting the drain tile around the foundation, or other pipes 108, from inside the pipes 108.

In addition to the foregoing, the present embodiments may include various machine learning, blockchain, augmented reality, virtual reality, non-fungible token (NFT), and metaverse embodiments.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

What is claimed is:

1. A computer-implemented method of detecting blockages or leaking pipes, the method comprising: tracking, via one or more local or remote processors, transceivers, and/or sensors, a water-resistant pill sensor traveling through one or more piping systems and/or tracking a position or estimated location of the pill sensor as the pill sensor travels through the one or more piping systems; estimating, via the one or more local or remote processors, transceivers, and/or sensors, a travel speed and/or travel time of the pill sensor through the one or more piping systems; determining or detecting, via the one or more local or remote processors, transceivers, and/or sensors, that a blockage or leak in the one or more piping systems exists based upon the pill sensor (i) travel speed, (ii) travel time, (iii) movement through the one or more piping systems, (iv) images, (v) audio or acoustic data sets, or (vi) other data sets; and when a blockage or leak exists: (a) determining or detecting, via the one or more local or remote processors, transceivers, and/or sensors, a location of the blockage or leak in the one or more piping systems exists; (b) generating and transmitting, via the one or more local or remote processors, transceivers, and/or sensors, an electronic notification detailing the blockage or leak, and a location of the blockage or leak, to a mobile device of a user or home owner; and (c) generating and transmitting, via the one or more local or remote processors, transceivers, and/or sensors, an electronic notification detailing one or more corrective actions to mitigate an impact of the blockage or leak to the mobile device of the user or home owner.

2. The computer-implemented method of claim 1, wherein the pill sensor is configured for wireless communication and includes one or more processors, transceivers, sensors, GPS units, camaras, LIDAR units, acoustic units, RFID component(s), clocks, timers, odor detectors/sensors, and/or other electronic or electrical components.

3. The computer-implemented method of claim 1, wherein the corrective action is associated with clearing the blockage in the one or more piping systems.

4. The computer-implemented method of claim 1, wherein the corrective action is associated with fixing the leak in the one or more piping systems and/or a broken or leaking pipe.

5. The computer-implemented method of claim 1, the method comprising:
receiving, via the one or more local or remote processors, transceivers, and/or sensors, images of the blockage, or one or more blockages, in the one or more piping systems from the pill sensor.

6. The computer-implemented method of claim 1, the method comprising:
receiving, via the one or more local or remote processors, transceivers, and/or sensors, images of the leak, or one or more leaks, in the one or more piping systems from the pill sensor.

7. The computer-implemented method of claim 1, the method comprising:
receiving, via the one or more local or remote processors, transceivers, and/or sensors, photographic images of the leak, or one or more leaks, in the one or more piping systems taken by a camera located on the pill sensor.

8. The computer-implemented method of claim 1, the method comprising:
receiving, via the one or more local or remote processors, transceivers, and/or sensors, radar-related or acoustic-related images of the leak, or one or more leaks, in the one or more piping systems taken or acquired by one or more radar or acoustic units located on the pill sensor.

9. The computer-implemented method of claim 1, the method comprising: receiving, via the one or more local or remote processors, transceivers, and/or sensors, a speed, location, and acceleration of the pill sensor; and determining, via the one or more local or remote processors, transceivers, and/or sensors, the blockage or leak in the one or more piping systems using the speed, location, and/or acceleration of the pill sensor.

10. The computer-implemented method of claim 1, the method comprising: receiving, via the one or more local or remote processors, transceivers, and/or sensors, one or more of a direction, a trajectory, the speed, an acceleration, a velocity, the location, the movement, the travel time, or a travel distance of the pill sensor; and generating and transmitting, via the one or more local or remote processors, transceivers, and/or sensors, one or more maps of the one or more piping systems to the mobile device of the user or home owner.

11. A computer system for detecting blockages or leaks in pipes or piping systems, the computer system comprising: one or more local or remote processors, transceivers, and/or sensors; and one or more water-resistant pill sensors; the one or more local or remote processors, transceivers, and/or sensors configured to track a pill sensor traveling through one or more piping systems and/or track a position or estimated location of the pill sensor as the pill sensor travels through the one or more piping systems; estimate a travel speed and/or travel time of the pill sensor through the one or more piping systems; determine or detect that a blockage or leak in the one or more piping systems exists based upon the pill sensor (i) travel speed, (ii) travel time, (iii) movement through the one or more piping systems, (iv) images, (v) audio or acoustic data, or (vi) other data sets; and when a blockage or leak exists: (a) determine or detect a location of the blockage or leak in the one or more piping systems exists; (b) generate and transmit an electronic notification detailing the blockage or leak, and a location of the blockage or leak, to a mobile device of a user or home owner; and (c) generate and transmit an electronic notification detailing one or more corrective actions to mitigate an impact of the blockage or leak to the mobile device of the user or home owner.

12. The computer system of claim 11, wherein the pill sensor is configured for wireless communication and includes one or more processors, transceivers, sensors, GPS units, camaras, LIDAR units, acoustic units, RFID component(s), recorders, clocks, timers, odor detectors/sensors, and/or other electronic or electrical components.

13. The computer system of claim 11, wherein the corrective action is associated with clearing the blockage in the one or more piping systems.

14. The computer system of claim 11, wherein the corrective action is associated with fixing the leak in the one or more piping systems and/or a broken or leaking pipe.

15. The computer system of claim 11, the one or more local or remote processors, transceivers, and/or sensors further configured to:
receive images of the blockage, or one or more blockages, in the one or more piping systems from the pill sensor.

16. The computer system of claim 11, the one or more local or remote processors, transceivers, and/or sensors further configured to:
receive images of the leak, or one or more leaks, in the one or more piping systems from the pill sensor.

17. The computer system of claim 11, the one or more local or remote processors, transceivers, and/or sensors further configured to:
receive photographic images of the leak, or one or more leaks, in the one or more piping systems taken by a camera located on the pill sensor.

18. The computer system of claim 11, the one or more local or remote processors, transceivers, and/or sensors further configured to:
receive radar-related, acoustic-related or sonar-related images of the leak, or one or more leaks, in the one or more piping systems taken or acquired by one or more radar or acoustic units located on the pill sensor.

19. The computer system of claim 11, the one or more local or remote processors, transceivers, and/or sensors further configured to: receive a speed, location, and acceleration of the pill sensor; and determine the blockage or leak in the one or more piping systems using the speed, location, and/or acceleration of the pill sensor.

20. The computer system of claim 11, the one or more local or remote processors, transceivers, and/or sensors further configured to: receive one or more of a direction, a trajectory, the speed, an acceleration, a velocity, the location, the movement, the travel time, or a travel distance of the pill sensor; and generate and transmit one or more maps of the one or more piping systems to the mobile device of the user or home owner.

* * * * *